United States Patent
Wang et al.

(10) Patent No.: US 9,648,321 B2
(45) Date of Patent: May 9, 2017

(54) CODING PICTURE ORDER COUNT VALUES IDENTIFYING LONG-TERM REFERENCE FRAMES

(71) Applicant: Qualcomm Incorporated, San Diego, CA (US)

(72) Inventors: Ye-Kui Wang, San Diego, CA (US); Adarsh Krishnan Ramasubramonian, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 639 days.

(21) Appl. No.: 13/689,559

(22) Filed: Nov. 29, 2012

(65) Prior Publication Data
US 2013/0142257 A1    Jun. 6, 2013

Related U.S. Application Data

(60) Provisional application No. 61/566,359, filed on Dec. 2, 2011, provisional application No. 61/589,295, filed
(Continued)

(51) Int. Cl.
*H04N 19/00* (2014.01)
*H04N 19/50* (2014.01)
(Continued)

(52) U.S. Cl.
CPC ....... *H04N 19/00569* (2013.01); *H04N 19/50* (2014.11); *H04N 19/503* (2014.11); *H04N 19/70* (2014.11)

(58) Field of Classification Search
CPC .......... G06K 9/36; H04N 19/46; H04N 19/58; H04N 19/70; H04N 19/44; H04N 19/573;
(Continued)

(56) References Cited

U.S. PATENT DOCUMENTS 8,284,846 B2    10/2012  Lamy-Bergot et al.
8,406,292 B2*    3/2013  Shimada et al. ......... 375/240.02
(Continued)

FOREIGN PATENT DOCUMENTS

CN      101065780 A    10/2007
CN      101208954 A     6/2008
(Continued)

OTHER PUBLICATIONS

Internation Preliminary Report on Patentability—PCT/US2012/067362, The Internation Bureau of WIPO—Geneva, Switzerland—Mar. 11, 2014, 14 pp.
(Continued)

*Primary Examiner* — Frank Huang
(74) *Attorney, Agent, or Firm* — Shumaker & Sieffert, P.A.

(57) ABSTRACT

In general, techniques are described for coding picture order count values identifying long-term reference pictures. A video decoding device comprising a processor may perform the techniques. The processor may determine least significant bits (LSBs) of a picture order count (POC) value that identifies a long-term reference picture (LTRP). The LSBs do not uniquely identify the POC value with respect to the LSBs of any other POC value identifying any other picture in a decoded picture buffer (DPB). The processor may determine most significant bits (MSBs) of the POC value. The MSBs combined with the LSBs is sufficient to distinguish the POC value from any other POC value that identifies any other picture in the DPB. The processor may retrieve the LTRP from the decoded picture buffer based on the LSBs and MSBs of the POC value, and decode a current picture of the video data using the retrieved LTRP.

77 Claims, 7 Drawing Sheets

Related U.S. Application Data on Jan. 20, 2012, provisional application No. 61/624,933, filed on Apr. 16, 2012.

(51) Int. Cl.
*H04N 19/503* (2014.01)
*H04N 19/70* (2014.01)

(58) Field of Classification Search
CPC .......... H04N 19/423; H04N 7/26; H04N 7/36; H04N 7/50; H04N 19/172; H04N 19/426; H04N 19/85; H04N 19/61; H04N 7/12; H04N 7/32; H04N 19/513; G11B 27/034; G11B 27/036; G11B 2220/2562
See application file for complete search history.

(56) References Cited

U.S. PATENT DOCUMENTS

| | | | |
|---|---|---|---|
| 8,699,581 B2* | 4/2014 | Koyabu et al. ........ | 375/240.25 |
| 2005/0207490 A1 | 9/2005 | Wang et al. | |
| 2006/0023785 A1 | 2/2006 | Aggarwal et al. | |
| 2006/0133486 A1 | 6/2006 | Boyce | |
| 2007/0195882 A1 | 8/2007 | Tichelaar et al. | |
| 2008/0165860 A1 | 7/2008 | Sahraoui et al. | |
| 2009/0251528 A1 | 10/2009 | Friel et al. | |
| 2010/0118944 A1 | 5/2010 | Tanaka et al. | |
| 2012/0213286 A1 | 8/2012 | Wu et al. | |
| 2012/0269275 A1 | 10/2012 | Hannuksela | |

FOREIGN PATENT DOCUMENTS

| | | |
|---|---|---|
| CN | 101637028 A | 1/2010 |
| GB | 2399706 A | 9/2004 |
| RU | 2342803 C2 | 12/2008 |
| WO | 2008048515 A2 | 4/2008 |

OTHER PUBLICATIONS

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Hannuksela et al., "AHG21: On reference picture list construction and reference picture marking", JCT-VC Meeting; MPEG Meeting; Nov. 21-30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G643, XP030110627, 11 pp.

Response to Written Opinion dated Mar. 4, 2013, from International Application No. PCT/US2012/067362, filed Sep. 25, 2013, 59 pp.

Second Written Opinion from International Application No. PCT/US2012/067362, dated Dec. 2, 2013, 21 pp.

Response to Second Written Opinion dated Dec. 2, 2013, from International Application No. PCT/US2012/067362, filed Jan. 31, 2014, 55 pp.

Boyce et al., "JCT-VC break-out report: Reference picture buffering and list construction (AHG21)," Document: JCTVC-G1002, 7th Meeting: Geneva, CH, Nov. 21-30, 2011, 21 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011,193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 2011, JCTVC-G1103_d2, 214 pp.

Bross et al., "High efficiency video coding (HEVC) text specification draft 6," 7th Meeting: Geneva, CH, Nov. 21-30, 2011, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Deshpande et al., "AHG21: Comments on Signaling of Reference Pictures,"Document JCTVC-H0531, 8th Meeting: San Jose, CA, USA, Feb. 1-10, 2012, 5 pp.

International Search Report and Written Opinion—PCT/US2012/067355—ISA/EPO—Mar. 4, 2013, 17 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Sjöberg et al., "Proposed changes to the HEVC Working Draft," Joint Collaborative Team on Video Coding, attachment to JCTVC-F493, Jul. 14-22, 2011, 28 pp.

Sjöberg, et al., "Absolute signaling of reference pictures," Document JCTVC-F493, WG11 No. m20923, 6th Meeting: Torino, IT 2011, 15 pp.

Sullivan et al., "AHG21: Proposal on Decoded Picture Buffer Description Syntax relating to AHG21 and JCTVC-F493," Document JCTVC-G788_r1, 7th Meeting: Geneva, CH, Nov. 21-30, 2012, 11 pp.

Wahadaniah et al., "AHG21: Construction and modification of predefined reference picture sets and reference picture lists", Document JCTVC-G548, 7th Meeting: Geneva, CH, Nov. 21-30, 2011, 21 pp.

Wang et al., "AHG15: On reference picture set," Document JCTVC-I0342, 9th Meeting: Geneva, CH, Apr. 27-May 7, 2012, 6 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (for FDIS & Last Call)," 10th Meeting: Geneva, CH, Jan. 14-23, 2013, JCTVC-L1003_v34, 310 pp.

Sullivan et al., "Editor's draft revision to ITU-T Rec. H.264 ISO/IEC 1446-10 Advanced Video Coding—in preparation for ITU-T SG 16 AAP Consent (in integrated form)," Document JVT-AA007, Filename JVT-AD007.doc, 30th Meeting, Geneva, CH, Jan. 29-Feb. 3, 2009, 687 pp.

Vetro et al., "Joint Draft 8.0 on Multiview Video Coding," Document JVT-AB204, 28th Meeting: Hannover, DE, Jul. 20-25, 2008, 63 pp.

Co-pending U.S. Appl. No. 13/689,547, filed Nov. 29, 2012.

Chen, et.al., "Efficient POC Signaling for Temporal Scalability", Joint Collaborative Team on Video Coding (JCT-VC) of ITU-T SG16 WP3 and ISO/IEC JTC1/SC29/WG11, JCTVC-H0501r1, Version 2, Jan. 31, 2012, 4 pp.

Hannuksela, "POC Type 1", Joint Collaborative Team on Video Coding (JCT-VC) of ITU-T SG16 WP3 and ISO/IEC JTC1/SC29/WG11, Nov. 21-30, 2011, JCTVC-G668, version 1, Nov. 8, 2011, URL: http://phenix.it-sudparis.eu/jct/doc_end_user/documents/7_Geneva/wg11/JCTVC-G668-v1.zip, 2 pp.

Joshi, et al., "Temporally Adaptive POC Coding", Joint Collaborative Team on Video Coding (JCT-VC) of ITU-T-SG16WP3 and ISO/IECJTC1/SC29/WG11, Apr. 27-May 7th, 2012, JCTVC-I0345_r1, Version 2, Apr. 28, 2012, 8 pp.

Wang, et al., "Common conditions for reference picture marking and list construction proposals," JCT-VC document JCTVC-G1036d03, 7th JCT-VC Meeting; Geneva, CH, Nov. 21-30, 2011, Jan. 4, 2012; 13 pp.

(56) References Cited

OTHER PUBLICATIONS

Wang, et al., "Common conditions for reference picture marking and list construction proposals," JCT-VC document JCTVC-H0725, 8th JCT-VC Meeting; San Jose, CA, USA, Feb. 1-10, 2012, Feb. 22, 2012; 15 pp.

* cited by examiner

CODING PICTURE ORDER COUNT VALUES IDENTIFYING LONG-TERM REFERENCE FRAMES

This application claims the benefit of U.S. Provisional Application No. 61/566,359, filed Dec. 2, 2011, U.S. Provisional Application No. 61/589,295, filed on Jan. 20, 2012 and U.S. Provisional Application No. 61/624,933, filed on Apr. 16, 2012, the entire contents of which each are hereby incorporated by reference in their respective entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010.

Video compression techniques perform spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to neighboring blocks. Blocks in an inter-coded (P or B) frame or slice may use spatial prediction with respect to neighboring blocks in the same frame or slice or temporal prediction with respect to other reference frames.

Efforts have been made to develop new video coding standards based on H.264/AVC. One such standard is the scalable video coding (SVC) standard, which is the scalable extension to H.264/AVC. Another standard is the multi-view video coding (MVC) standard, which has become the multiview extension to H.264/AVC. A joint draft of MVC is described in JVT-AB204, "Joint Draft 8.0 on Multiview Video Coding," 28$^{th}$ JVT meeting, Hannover, Germany, July 2008, available at http://wftp3.itu.int/av-arch/jvt-site/2008_07_Hannover/JVT-AB204.zip. A version of the AVC standard is described in JVT-AD007, "Editors' draft revision to ITU-T Rec. H.264|ISO/IEC 14496-10 Advanced Video Coding—in preparation for ITU-T SG 16 AAP Consent (in integrated form)," 30th JVT meeting, Geneva, CH, February 2009," available from http://wftp3.itu.int/av-arch/jvt-site/2009_01_Geneva/JVT-A D007.zip. This document integrates SVC and MVC in the AVC specification.

SUMMARY

In general, techniques are described that provide various methods for deriving a reference picture set (RPS) and signaling of long-term reference pictures (LTRPs) to be included in the RPS of a coded picture for use when performing inter-prediction aspects of video coding.

In one example, a method of encoding video data comprises determining, for a current picture of the video data, a long term reference picture to be used when encoding at least a portion of a current picture of the video data and determining a number of bits to be used to represent one or more least significant bits of a picture order count value that identifies the long-term reference picture in a bitstream representative of an encoded version of the video data. The method further comprises specifying the one or more least significant bits of the picture order count value that identifies the long-term reference picture in the bitstream using the determined number of bits used to represent one or more least significant bits of the picture order count value that identifies the long-term reference picture and encoding at least the portion of the current picture using the long-term reference picture.

In another example, a video encoding device configured to encode video data comprises one or more processors configured to determine, for a current picture of the video data, a long term reference picture to be used when encoding at least a portion of a current picture of the video data, determine a number of bits to be used to represent one or more least significant bits of a picture order count value that identifies the long-term reference picture in a bitstream representative of an encoded version of the video data, specify the one or more least significant bits of the picture order count value that identifies the long-term reference picture in the bitstream using the determined number of bits used to represent one or more least significant bits of the picture order count value that identifies the long-term reference picture, and encode at least the portion of the current picture using the long-term reference picture.

In another example, a video encoding device for encoding video data comprises means for determining, for a current picture of the video data, a long term reference picture to be used when encoding at least a portion of a current picture of the video data and means for determining a number of bits to be used to represent one or more least significant bits of a picture order count value that identifies the long-term reference picture in a bitstream representative of an encoded version of the video data. The video encoding device further comprises means for specifying the one or more least significant bits of the picture order count value that identifies the long-term reference picture in the bitstream using the determined number of bits used to represent one or more least significant bits of the picture order count value that identifies the long-term reference picture, and means for encoding at least the portion of the current picture using the long-term reference picture.

In another example, a non-transitory computer-readable storage medium has stored thereon instructions that, when executed, cause one or more processors of a video encoding device to determine, for a current picture of video data, a long term reference picture to be used when encoding at least a portion of a current picture of the video data, determine a number of bits to be used to represent one or more least significant bits of a picture order count value that identifies the long-term reference picture in a bitstream representative of an encoded version of the video data, specify the one or more least significant bits of the picture order count value that identifies the long-term reference picture in the bitstream using the determined number of bits used to represent one or more least significant bits of the picture order count value that identifies the long-term reference picture, and encode at least the portion of the current picture using the long-term reference picture.

In another example, a method of decoding encoded video data comprises determining, for a current picture of the encoded video data, a number of bits used to represent one or more least significant bits of the picture order count value that identifies a long-term reference picture to be used when decoding at least a portion of the current picture, and parsing the determined number of bits from a bitstream representative of the encoded video data, wherein the parsed determined number of bits represents the one or more least significant bits of the picture order count value that identifies the long-term reference picture. The method further comprises retrieving the long-term reference picture from a decoded picture buffer based on the least significant bits of the picture order count value that identifies the long-term reference picture, and decoding at least the portion of the current picture using the retrieved long-term reference picture.

In another example, a video decoding device for decoding encoded video data comprises one or more processors configured to determine, for a current picture of the encoded video data, a number of bits used to represent one or more least significant bits of the picture order count value that identifies a long-term reference picture to be used when decoding at least a portion of the current picture, parse the determined number of bits from a bitstream representative of the encoded video data, wherein the parsed determined number of bits represents the one or more least significant bits of the picture order count value that identifies the long-term reference picture, retrieve the long-term reference picture from a decoded picture buffer based on the least significant bits of the picture order count value that identifies the long-term reference picture, and decode at least the portion of the current picture using the retrieved long-term reference picture.

In another example, a video decoding device for decoding encoded video data comprises means for determining, for a current picture of the encoded video data, a number of bits used to represent one or more least significant bits of the picture order count value that identifies a long-term reference picture to be used when decoding at least a portion of the current picture, and means for parsing the determined number of bits from a bitstream representative of the encoded video data, wherein the parsed determined number of bits represents the one or more least significant bits of the picture order count value that identifies the long-term reference picture. The video decoding device also comprises means for retrieving the long-term reference picture from a decoded picture buffer based on the least significant bits of the picture order count value that identifies the long-term reference picture, and means for decoding at least the portion of the current picture using the retrieved long-term reference picture.

In another example, a non-transitory computer-readable storage medium having stored thereon instructions that, when executed, cause one or more processor of a video decoding device to determine, for a current picture of encoded video data, a number of bits used to represent one or more least significant bits of the picture order count value that identifies a long-term reference picture to be used when decoding at least a portion of the current picture, parse the determined number of bits from a bitstream representative of the encoded video data, wherein the parsed determined number of bits represents the one or more least significant bits of the picture order count value that identifies the long-term reference picture, retrieve the long-term reference picture from a decoded picture buffer based on the least significant bits of the picture order count value that identifies the long-term reference picture, and decode at least the portion of the current picture using the retrieved long-term reference picture.

In another example, a method of encoding video data comprises determining, for a current picture of the video data, one or more least significant bits of a picture order count value that identifies a long-term reference picture to be used when encoding at least a portion of the current picture, and when one or more least significant bits of any other picture order count values that identify any other picture stored to a decoded picture buffer to which the long-term reference picture is also stored are the same as the determined one or more least significant bits of the picture order count value that identifies the long-term reference picture, determining one or more most significant bits of the picture order count value that identifies the long-term reference picture to be used when encoding at least the portion of the current picture. The number of the one or more least significant bits when added to a number of the one or more most significant bits results in a total that is less than a total number of bits to specify the picture order count value. The method also comprises specifying both the determined one or more least significant bits and the determined one or more most significant bits of the picture order count value that identifies the long-term reference picture to be used when encoding at least the portion of the current picture in a bitstream representative of an encoded version of the video data, and encoding at least the portion of the current picture using the long-term reference picture.

In another example, a video encoding device for encoding video data, the video encoding device comprises one or more processors configured to determine, for a current picture of the video data, one or more least significant bits of a picture order count value that identifies a long-term reference picture to be used when encoding at least a portion of the current picture, when one or more least significant bits of any other picture order count values that identify any other picture stored to a decoded picture buffer to which the long-term reference picture is also stored are the same as the determined one or more least significant bits of the picture order count value that identifies the long-term reference picture, determine one or more most significant bits of the picture order count value that identifies the long-term reference picture to be used when encoding at least the portion of the current picture, wherein a number of the one or more least significant bits when added to a number of the one or more most significant bits results in a total that is less than a total number of bits to specify the picture order count value, specify both the determined one or more least significant bits and the determined one or more most significant bits of the picture order count value that identifies the long-term reference picture to be used when encoding at least the portion of the current picture in a bitstream representative of an encoded version of the video data, and encode at least the portion of the current picture using the long-term reference picture.

In another example, a video encoding device for encoding video data comprises means for determining, for a current picture of the video data, one or more least significant bits of a picture order count value that identifies a long-term reference picture to be used when encoding at least a portion of the current picture, and when one or more least significant bits of any other picture order count values that identify any other picture stored to a decoded picture buffer to which the long-term reference picture is also stored are the same as the determined one or more least significant bits of the picture order count value that identifies the long-term reference picture, means for determining one or more most significant bits of the picture order count value that identifies the long-term reference picture to be used when encoding at least the portion of the current picture, wherein a number of the one or more least significant bits when added to a number of the one or more most significant bits results in a total that is less than a total number of bits to specify the picture order count value. The video encoding device also comprises means for specifying both the determined one or more least significant bits and the determined one or more most significant bits of the picture order count value that identifies the long-term reference picture to be used when encoding at least the portion of the current picture in a bitstream representative of an encoded version of the video data, and means for encoding at least the portion of the current picture using the long-term reference picture.

In another example, a non-transitory computer-readable storage medium has stored thereon instructions that, when executed, cause one or more processors of a video encoding device to determine, for a current picture of video data, one or more least significant bits of a picture order count value that identifies a long-term reference picture to be used when encoding at least a portion of the current picture, when one or more least significant bits of any other picture order count values that identify any other picture stored to a decoded picture buffer to which the long-term reference picture is also stored are the same as the determined one or more least significant bits of the picture order count value that identifies the long-term reference picture, determine one or more most significant bits of the picture order count value that identifies the long-term reference picture to be used when encoding at least the portion of the current picture, wherein a number of the one or more least significant bits when added to a number of the one or more most significant bits results in a total that is less than a total number of bits to specify the picture order count value, specify both the determined one or more least significant bits and the determined one or more most significant bits of the picture order count value that identifies the long-term reference picture to be used when encoding at least the portion of the current picture in a bitstream representative of an encoded version of the video data, and encode at least the portion of the current picture using the long-term reference picture.

In another example, a method of decoding encoded video data comprises determining, for a current picture of the encoded video data, one or more least significant bits of a picture order count value that identify a long-term reference picture to be used when decoding at least a portion of the current picture. The one or more least significant bits do not uniquely identify the picture order count value of the long-term reference picture with respect to the one or more least significant bits of any other picture order count value that identifies any other picture present in a decoded picture buffer to which the long-term reference picture is also stored. Also, a number of the one or more least significant bits when added to a number of the one or more most significant bits results in a total that is less than a total number of bits to specify the picture order count value. The method further comprises determining one or more most significant bits of the picture order count value that identifies the long-term reference picture, wherein the one or more most significant bits in combination with the determined one or more least significant bits is sufficient to distinguish the picture order count value that identifies the long-term reference picture from any other picture order count value that identifies any other picture in the decoded picture buffer. Additionally, the method comprises retrieving the long-term reference picture from the decoded picture buffer based on the determined one or more least significant bits of the picture order count value and the determined one or more most significant bits of the picture order count value, and decoding at least the portion of the current picture using the retrieved long-term reference picture.

In another example, a video decoding device for decoding encoded video data comprises one or more processors configured to determine, for a current picture of the encoded video data, one or more least significant bits of a picture order count value that identify a long-term reference picture to be used when decoding at least a portion of the current picture, wherein the one or more least significant bits do not uniquely identify the picture order count value of the long-term reference picture with respect to the one or more least significant bits of any other picture order count value that identifies any other picture present in a decoded picture buffer to which the long-term reference picture is also stored, and wherein a number of the one or more least significant bits when added to a number of the one or more most significant bits results in a total that is less than a total number of bits to specify the picture order count value, determine one or more most significant bits of the picture order count value that identifies the long-term reference picture, wherein the one or more most significant bits in combination with the determined one or more least significant bits is sufficient to distinguish the picture order count value that identifies the long-term reference picture from any other picture order count value that identifies any other picture in the decoded picture buffer, retrieve the long-term reference picture from the decoded picture buffer based on the determined one or more least significant bits of the picture order count value and the determined one or more most significant bits of the picture order count value, and decode at least the portion of the current picture using the retrieved long-term reference picture.

In another example, a video decoding device for decoding encoded video data comprises means for determining, for a current picture of the encoded video data, one or more least significant bits of a picture order count value that identify a long-term reference picture to be used when decoding at least a portion of the current picture, wherein the one or more least significant bits do not uniquely identify the picture order count value of the long-term reference picture with respect to the one or more least significant bits of any other picture order count value that identifies any other picture present in a decoded picture buffer to which the long-term reference picture is also stored, and wherein a number of the one or more least significant bits when added to a number of the one or more most significant bits results in a total that is less than a total number of bits to specify the picture order count value. The video decoding device also comprises means for determining one or more most significant bits of the picture order count value that identifies the long-term reference picture, wherein the one or more most significant bits in combination with the determined one or more least significant bits is sufficient to distinguish the picture order count value that identifies the long-term reference picture from any other picture order count value that identifies any other picture in the decoded picture buffer. Additionally, the video decoding device comprises means for retrieving the long-term reference picture from the decoded picture buffer based on the determined one or more least significant bits of the picture order count value and the determined one or more most significant bits of the picture order count value, and means for decoding at least the portion of the current picture using the retrieved long-term reference picture.

In another example, a non-transitory computer-readable storage medium has stored thereon instructions that, when executed, cause one or more processors of video decoding device to determine, for a current picture of encoded video data, one or more least significant bits of a picture order count value that identify a long-term reference picture to be used when decoding at least a portion of the current picture, wherein the one or more least significant bits do not uniquely identify the picture order count value of the long-term reference picture with respect to the one or more least significant bits of any other picture order count value that identifies any other picture present in a decoded picture buffer to which the long-term reference picture is also stored, and wherein a number of the one or more least significant bits when added to a number of the one or more most significant bits results in a total that is less than a total number of bits to specify the picture order count value, determine one or more most significant bits of the picture order count value that identifies the long-term reference picture, wherein the one or more most significant bits in combination with the determined one or more least significant bits is sufficient to distinguish the picture order count value that identifies the long-term reference picture from any other picture order count value that identifies any other picture in the decoded picture buffer, retrieve the long-term reference picture from the decoded picture buffer based on the determined one or more least significant bits of the picture order count value and the determined one or more most significant bits of the picture order count value, and decode at least the portion of the current picture using the retrieved long-term reference picture.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
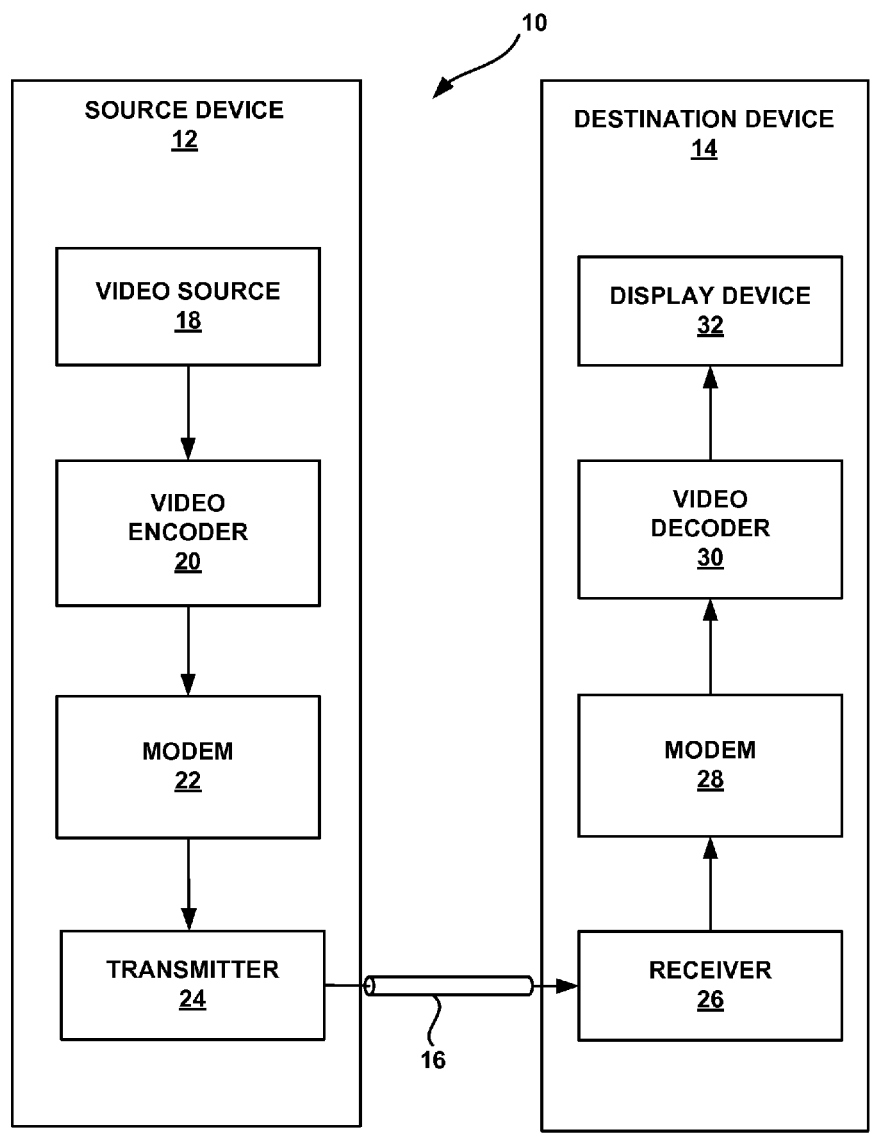
FIG. 1 is a block diagram illustrating an example video encoding and decoding system that may utilize techniques for coding video data.

In general, techniques are described that provide various methods for deriving a reference picture set (RPS) and signaling of long-term reference pictures (LTRPs) to be included in the RPS of a coded picture for use when performing inter-prediction aspects of video coding. For example, a video coder (which is a term that may refer to one or both of a video encoder and a video decoder) includes a decoded picture buffer (DPB). The DPB stores reference pictures, which are pictures that can be used for inter-predicting a picture. In other words, the video coder may predict a picture based on one or more reference pictures stored in the DPB.

The video decoder may also be tasked with constructing reference picture lists that indicate which reference pictures are used for inter-prediction purposes. Two of these reference picture lists are referred to as List 0 and List 1, respectively. The video decoder first employs default construction techniques to construct List 0 and List 1. (e.g., preconfigured construction schemes for constructing List 0 and List 1). Optionally, after the initial List 0 and List 1. are constructed, the decoder may decode syntax elements, when present, that instruct the video decoder to modify the initial List 0 and List 1.

The video encoder may signal syntax elements that are indicative of identifier(s) of reference pictures in the DPB, and the video encoder may also signal syntax elements that include indices, within List 0, List 1, or both List 0 and List 1., that indicate which reference picture or pictures to use to decode a coded block of a current picture. The video decoder, in turn, uses the received identifier to identify the index value or values for a reference picture or reference pictures listed in List 0, List 1, or both List 0 and List 1. From the index value(s) as well as the identifier(s) of the reference picture or reference pictures, the video coder retrieves the reference picture or reference pictures from the DPB, and decodes the coded block of the current picture.

In a picture parameter set (PPS) or a sequence parameter set (SPS) associated with or slice header of a current picture, the video encoder may signal the RPS. The RPS of a current picture includes identification information for reference pictures that can be used to predict the current picture and pictures that can be used to predict pictures following the current picture in decoding order. Only reference pictures in the RPS may be included in List 0 or List 1.

The identification information for the reference pictures may include one or more picture order count (POC) values. POC values indicate the order in which the pictures within a coded video sequence are output or displayed (i.e., the display order of the pictures). For example, a picture with a lower POC value is displayed earlier than a picture with a higher POC value in the same coded video sequence.

The first aspect of the techniques described in this disclosure is directed to techniques for directly signaling long-term reference pictures for a current picture. For example, reference pictures may be classified as short-term reference pictures and long-term reference pictures. Short-term reference pictures are pictures that are typically temporally proximate to the current picture in output order.

In accordance with the first aspect of the techniques described in this disclosure, rather than encode delta POC LSBs that identify a long-term reference picture that is present in the decoded picture buffer but not specified in the associated SPS using exponential-Golomb coding, a video encoder may directly specify (signal) the POC LSBs of such a long-term reference picture using variable fixed unary codes. That is, the video encoder may specify the number of bits used to signal these POC LSBs, which are signaled in a slice header associated with the current picture. The specified number of bits signals to the video decoder the number of bits that are to be parsed from the bitstream and that represent the POC LSBs that identify the long-term reference picture that is present in the decoded picture buffer but not specified in the associated SPS. Given the wider distribution of values in the context of such POC LSB values, the techniques may promote bit savings by encoding these POC LSBs as uniform length (and variable, in the sense that the uniform length may be signaled or derived for each slice) unsigned binary numbers, denoted as "u(v)" in various video coding standards.

In this way, a video decoder may determine a number of bits used to represent one or more least significant bits of the picture order count value that identifies a long-term reference picture to be used when decoding the current picture. Often, the video decoder may determine the number of bits from a syntax element specified in one or more of a slice header, picture parameter set or sequence parameter set. Alternatively, the video decoder may derive the number of bits based on other syntax elements without explicitly receiving a syntax element that specifies the number of bits. The video decoder may then parse the determined number of bits from the bitstream, where these parsed number of bits represents the significant bits of the POC value that identifies the long-term reference picture. The video decoder may then retrieve the long-term reference picture from a decoded picture buffer based on the least significant bits of the POC value that identifies the long-term reference picture and decode at least the portion of the current picture using the retrieved long-term reference picture.

In accordance with a second aspect of the techniques described in this disclosure, the video encoder may further or alternatively be configured to analyze each picture present in the entire decoded picture buffer when determining whether it is necessary to signal additional information, e.g. some of or all the most significant bits (MSBs), for disambiguating the POC LSBs. In other words, the video encoder computes a set of one or more POC LSBs for each POC value that identifies a picture in the DPB. When performing the analysis, the video encoder determines whether the set of POC LSBs computed for each of the long-term reference pictures signaled in the slice header is unique with respect to all the other sets of POC LSBs computed for the POC values that identifies all the other pictures in the DPB. If one of these other sets of POC LSBs is equal to the set of POC LSBs of the current long-term reference pictures under the analysis, the set of POC LSBs is determined not to be unique, and the video encoder may then signal sufficient most significant bits (MSBs) so as to enable the POC value of the long-term reference picture to be correctly derived by the video decoder.

In this way, the video decoder may receive a bitstream representative of the encoded video data from the video encoder, which has been encoded in accordance with various aspects of the techniques described in this disclosure. The video decoder may then determine the least significant bits of the POC value that identifies the long-term reference picture to be used when decoding the current picture. As noted above, these least significant bits may not uniquely identify the picture order count value of the long-term reference picture with respect to the least significant bits of any other POC value that identifies any other picture present in a decoded picture buffer to which the long-term reference picture is also stored. As a result, the video decoder may then determine one or more most significant bits of the POC value that identifies the long-term reference picture. The video encoder selects the most significant bits such that the most significant bits in combination with the least significant bits is sufficient to distinguish the POC value that identifies the long-term reference picture from any other picture order count value that identifies any other picture in the decoded picture buffer. The video decoder may then retrieve the long-term reference picture from the decoded picture buffer based on the unambiguous combination of the least significant bits and the most significant bits and decode the current picture using the retrieved long-term reference picture.

FIG. 1 is a block diagram illustrating an example video encoding and decoding system 10 that may utilize the techniques described in this disclosure for deriving RPS and signaling LTRPs. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless. The techniques of this disclosure are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless, wired, or storage media suitable for transmission or storage of encoded video data.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. Video encoder 20 may be configured to apply the techniques of this disclosure. In other examples, a source device and a destination device may include other components or arrangements. For example, source device 12 may receive video data from an external video source, such as an external camera. Likewise, destination device 14 may interface with an external display device, rather than including an integrated display device.

The system 10 of FIG. 1 is merely one example. Techniques for coding video data may be performed by various digital video encoding and/or decoding device. The techniques of this disclosure may be performed by a video encoder/decoder, typically referred to as a "CODEC." Moreover, the techniques of this disclosure may also be performed by a video preprocessor. Source device 12 and destination device 14 are merely examples of such coding devices. In some examples, devices 12, 14 may operate in a substantially symmetrical manner such that each of devices 12, 14 include video encoding and decoding components. Hence, system 10 may support one-way or two-way video transmission between source device 12 and destination device 14, e.g., for video streaming, video playback, video broadcasting, or video telephony.

Video source 18 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over communication channel 16 and modem 28 demodulates the information. The information communicated over communication channel 16 may include syntax information defined by video encoder 20 that includes syntax elements that describe characteristics and/or processing of blocks and other coded units, e.g., groups of pictures (GOPs). Display device 32 displays the decoded video data to a user. Display device 32 may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 may represent any suitable communication medium, or collection of different communication media, for transmitting video data from source device 12 to destination device 14, including suitable combinations of wired or wireless media. Communication channel 16 may include routers, switches, base stations, or any other equipment that may be useful to facilitate communication from source device 12 to destination device 14. In other examples, source device 12 may store encoded data onto a storage medium, rather than transmitting the data. Likewise, destination device 14 may be configured to retrieve encoded data from a storage medium.

Video encoder 20 and video decoder 30 may operate according to a video compression standard, such as the ITU-T H.264 standard, alternatively referred to as MPEG-4, Part 10, Advanced Video Coding (AVC), or the upcoming High Efficiency Video Coding standard, which may also be commonly referred to as H.265. While the techniques are generally described in this disclosure with respect to HEVC, the techniques may also be implemented or otherwise used for alternative video coding standards, such as H.264/Advanced Video Coding (AVC) standard. HEVC is being developed by the Joint Collaborative Team on Video Coding (JCT-VC) of the ITU-T Video Coding Experts Group (VCEG) and ISO/IEC Motion Picture Experts Group (MPEG). A recent Working Draft (WD) of HEVC, entitled and referred to as HEVC WD6 hereinafter, Bross et al, entitled "High efficiency video coding (HEVC) text specification draft 6," Joint Collaborative Team on Video Coding (JCT-VC) of ITU-T SG16 WP3 and ISO/IEC JTC1/SC29/WG11, 8$^{th}$ Meeting, San Jose, Calif., USA, 1-10 February, 2012, which is available from http://phenix.int-evry.fr/jct/doc_end_user/documents/8_San%20Jose/wg11/JCTVC-H1003-v22.zip. Additionally, other WDs of HEVC have also been approved, with the latest referred to as HEVC WD9, Bross et al., entitled "High efficiency video coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, 10-19 Oct. 2012, JCTVC-K1003_v9, being available at http://phenix.int-evry.fr/jct/doc_end_user/documents/11_Shanghai/wg11/JCTVC-K1003-v9.zip The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010.

The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. The term "processor" may generally be used to refer to any combination of the foregoing and may include non-transitory computer-readable media having stored thereon instructions that, when executed, cause this processor to perform the various techniques described in this disclosure. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone, camera, computer, mobile device, subscriber device, broadcast device, set-top box, gaming device, server, or the like.

A video sequence typically includes a series of video frames, alternatively referred to as pictures. A group of pictures (GOP) generally comprises a series of one or more video frames (which is another commonly known way to refer to a picture). A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. A video block may correspond to a macroblock or a partition of a macroblock in H.264, or a CU (that may include one or more prediction units (PUs) and/or transformation units (TUs)) of HEVC. The video blocks may have fixed or varying sizes, and may differ in size according to a specified coding standard. Each video frame may include a plurality of slices. Each slice may include a plurality of macroblocks (or LCUs), which may be partitioned into sub-blocks (or CUs).

As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Block sizes that are less than 16×16 may be referred to as partitions of a 16×16 block. Video blocks may comprise blocks of pixel data in the pixel domain, or blocks of transform coefficients in the transform domain. In some cases, a video block may comprise blocks of quantized transform coefficients in the transform domain.

Smaller video blocks may provide better resolution, and may be used for locations of a video frame that include high levels of detail. In general, blocks and the various partitions, sometimes referred to as sub-blocks, may be considered video blocks. In addition, a slice may be considered to be a plurality of video blocks, such as blocks and/or sub-blocks. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a GOP also referred to as a sequence, or another independently decodable unit defined according to applicable coding techniques. A GOP may also be referred to as a coded video sequence, e.g., in H.264/AVC and HEVC.

Video encoder 20 may generate network abstraction layer (NAL) units. A NAL unit may be a syntax structure containing an indication of a type of data in the NAL unit and bytes containing the data. For example, a NAL unit may contain data representing a sequence parameter set (SPS), a picture parameter set (PPS), a coded slice, supplemental enhancement information (SEI), an access unit delimiter, filler data, or another type of data. The data of a NAL unit may be in the form of a raw byte sequence payload (RBSP) interspersed with emulation prevention bits. A RBSP may be a syntax structure containing an integer number of bytes that is encapsulated within a NAL unit.

NAL units can be categorized to Video Coding Layer (VCL) NAL units and non-VCL NAL units. VCL units may include block, macroblock, and/or slice level data. Non-VCL NAL units may include parameter set NAL units and SEI NAL units, among others. Parameter sets may contain sequence-level header information (e.g., in a SPS) and the infrequently changing picture-level header information (e.g., in a PPS). With parameter sets (e.g., SPS and PPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

SEI messages may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points.

As noted above, a video coder (which is a term that may refer to one or both of video encoder 20 and video decoder 30) includes a decoded picture buffer (DPB), which is not shown in the example of FIG. 1 for ease of illustration purposes. The DPB stores reference pictures, which are pictures that can be used for inter-predicting a picture. In other words, the video coder may predict a picture based on one or more reference pictures stored in the DPB.

The video decoder may also be configured to construct reference picture lists that indicate which reference pictures are used for inter-prediction purposes. Two of these reference picture lists are referred to as List 0 and List 1., respectively. Video decoder 30 may first employ default construction techniques to construct List 0 and List 1 (e.g., preconfigured construction schemes for constructing List 0 and List 1., such as those set forth in HEVC WD 6 as one example). Optionally, video encoder 20 may be configured to signal syntax elements that specify which pictures stored to the DPB are to be used when constructing List 0 and List 1. Thus, after the initial List 0 and List 1 are constructed, video decoder 30 may decode the syntax elements, when present, that instruct video decoder 30 to modify the initial List 0 and List 1.

Video encoder 30 may signal syntax elements that are indicative of identifier(s) of reference pictures in the DPB. Video encoder 30 may also signal syntax elements that include indices, within List 0, List 1., or both List 0 and List 1., that indicate which reference picture or pictures stored to the DPB are to be used to decode a coded block of a current picture. Video decoder 30, in turn, uses the received identifier to identify the index value or values for a reference picture or reference pictures listed in List 0, List 1, or both List 0 and List 1. From the index value(s) as well as the identifier(s) of the reference picture or reference pictures, video decoder 30 retrieves the reference picture or reference pictures from the DPB, forms List 0 and List 1. and decodes the coded block of the current picture.

In a picture parameter set (PPS) or a sequence parameter set (SPS) associated with or slice header of a current picture, video encoder 20 may signal a reference picture set (which again may be referred to as the "RPS"). The RPS of a current picture includes identification information for reference pictures that can be used to predict the current picture and pictures that can be used to predict pictures following the current picture in decoding order. Only reference pictures in the RPS may be included in List 0 or List 1.

The identification information for the reference pictures may include one or more picture order count (POC) values. POC values indicate the order in which the pictures are output or displayed (i.e., the display order of the pictures). For example, a picture with a lower POC value is displayed earlier than a picture with a higher POC value in the same coded video sequence.

HEVC WD 6 band later working drafts, e.g., HEVC WD 9, typically provide for two different types of reference pictures referred to as short-term reference pictures (STRPs) and long-term reference pictures (LTRPs). Short-term reference pictures are pictures that are typically temporally proximate to the current picture in output order.

Long-term reference pictures are pictures that are typically temporally further away from the current picture, but may still be useful for prediction purposes. For example, in video conferencing, an initial few captured pictures may include background image content that may be useful in predicting pictures that are captured later in the video conference. As another example, a long-term reference picture may be treated differently than a short-term reference picture in motion vector scaling, or sample value scaling in weighted prediction.

A short-term reference picture may also be farther away from a current picture in output order than a long-term reference picture. In this sense, long-term reference pictures may refer to pictures that may be used multiple times as reference pictures, whereas short-term reference pictures may be used fewer times as reference pictures relative to long-term reference pictures. Relying only on short-term reference pictures for prediction may result in video decoder 30 not being able to use such long-term reference pictures that can be useful or desirable for coding efficiency or error resiliency.

To specify these long-term reference pictures, video encoder 20 may provide a list of long-term reference pictures that may be associated with and used to decode one or more pictures in the SPS. In headers of slices (which may also be referred to as "slice headers") of the associated one or more pictures, video encoder 20 may, in some instances, specify which of these long-term reference pictures specified in the SPS are to be used when decoding a particular picture. Often, video encoder 20 specifies an index identifying each of the long-term reference pictures specified in the SPS that are to be used when decoding a particular picture. Typically, it is required that all slice headers of a picture shall refer to the same reference picture set signaling.

In some instances, video encoder 20 may determine that one or more long-term reference pictures that are present in the decoded picture buffer, but that are not specified in the list of long-term reference pictures specified in the SPS, are to be used when decoding a particular picture. In this instance, video encoder 20 may specify (or, in the context of video coding, "signal") the POC values that are assigned to the one or more long-term reference pictures present in the DPB but that are not specified in the list of long-term reference pictures specified in the SPS.

To reduce the number of bits required to signal these POC values, video encoder 20 may determine a POC value as a function of the POC value assigned to the one of the pictures (which may be referred to as the "current picture" in the sense that this picture is the picture that is currently being decoded) to which the slice (which may be referred to as the "current slice" for similar reasons) to be decoded corresponds. To illustrate, video encoder 20 may subtract the POC value of the long-term reference picture from the POC value of the current picture to which the current slice corresponds to derive a delta POC value. In particular, the delta POC value may be represented by a selected number of least significant bits (LSBs) of the delta POC value. By only signaling the delta POC LSBs in a slice header, video encoder 20 may reduce the number of bits required to identify long-term reference pictures that are present in the decoded picture buffer but not specified in the SPS associated with the current slice; these long-term reference pictures are also referred to as being directly signaled in slice headers.

Previously, delta POC LSBs for specifying a POC value of a long-term reference picture were entropy encoded to improve resiliency to error and reduce the number of bits required to specify the POC value in the bitstream. In particular, these previous video encoders encoded delta POC LSBs of long-term reference pictures directly signaled in slice headers using a form of encoding denoted as "ue(v)" in various video coding standards, including HEVC. The term "ue(v)" refers to a form of encoding referred to as exponential-Golomb coding.

When the value to be specified is unsigned (which forms the "u" of "ue(v)," while the "e" refers to exponential in exponential-Golomb codes), exponential-Golomb coding involves signaling the number of bits used to encode a given value by specifying a number of zeros that equals one less than the number of bits to encode a given value and then specifying the given value plus one. If the delta POC LSB value is 0001, for example, the video encoder encoded this value as 0 (to indicate that the value may be signaled using one bit, i.e., 1 in this example) followed by 10 (given that the value of one plus one is two, which in binary is specified as 10), outputting an exponential-Golomb code of 010.

Because exponential-Golomb codes are a form of variable length coding (which refers to the fact that these codes are not of fixed or uniform length and instead vary based on what value is coded), exponential-Golomb coding is generally only suited for encoding information having certain statistical distributions of values. More specifically, exponential-Golomb coding is suited for coding information statistically likely to be specified as a small number. Computing the delta POC LSBs for specifying a current picture POC value generally involved computing a value of one (given that the current POC value was subtracted from the previous picture POC value to derive the delta POC LSBs in the context of signaling the POC value of the current picture). Accordingly, exponential-Golomb coding was chosen to encode these delta POC LSB values for specifying the POC value of the current picture. However, delta POC LSBs values for identifying long-term reference pictures represent information that has a vastly different distribution that is not well suited for the exponential-Golomb coding.

In accordance with the first aspect of the techniques described in this disclosure, rather than encode delta POC LSBs that identify a long-term reference picture that is present in the decoded picture buffer but not specified in the associated SPS using exponential-Golomb coding, video encoder 20 may directly specify (or, in other words, signal) the POC LSBs of such a long-term reference picture using variable fixed unary codes. That is, video encoder 20 may specify the number of bits used to signal these POC LSBs in a slice header associated with the current picture. The specified number of bits signals to the video decoder the number of bits that are to be parsed from the bitstream and that represent the POC LSBs that identify the long-term reference picture that is present in the decoded picture buffer but not specified in the associated SPS. Given the wider distribution of values in the context of such POC LSB values, the techniques may promote bit savings by encoding these POC LSBs as uniform length (and variable, in the sense that the uniform length may be signaled or derived for each slice) unsigned binary numbers, denoted as "u(v)" in various video coding standards.

In operation, video encoder 20 may determine, for a current picture of the video data, a long term reference picture to be used when encoding at least a portion of a current picture of the video data in the manner described above. Video encoder 20 may then determine a number of bits to be used to represent a set of one or more LSBs of a POC value that identifies the long-term reference picture in a bitstream representative of an encoded version of the video data. In other words, video encoder 20 may determine the "v" in the unsigned binary encoding denoted as "u(v)" with the "u," again denoting unsigned binary encoding.

Often, this number of LSBs is defined based on the number of LSBs required to disambiguate the LTRP from other LTRPs or any other reference picture stored in the DPB. In other words, this number may vary on a slice, picture or GOP basis. In some instances, the number of LSBs may be defined for an entire bitstream, or portions thereof. In some instances, the number of LSBs used to identify a POC value is pre-defined, such that there is no need to signal the number of LSBs. In some instances, the number of LSBs may be signaled for each picture, e.g., in the slice header. In some instances, the number of LSBs may be signaled for a number of pictures, e.g., in the SPS or PPS. In some instances, the number of LSBs used to identify the POC value may be derived based on syntax elements determined for the current picture and/or previously encoded pictures of the video data, where video encoder 20 may then not need to signal the number of bits used to represent this POC LSB given that video decoder 30 may perform a similar derivation process to derive the "v" number of bits used to represent the POC LSB.

In any event, video encoder 20 may then specify a set of one or more LSBs of the POC value that identifies the LTRP in the bitstream using the determined number of bits used to represent the number of a set of one or more LSBs of the POC value that identifies the long-term reference picture. In other words, video encoder 20 may specify the POC LSBs noted above in the bitstream using the "v" number of bits as an unsigned binary number. Video encoder 20 may also encode at least the portion of the current picture using the LTRP. Video encoder 20 may encode at least the portion of the current picture before, after or concurrent to specifying in the bitstream the POC LSBs as an unsigned binary value of "v" bits in length. Video encoder 20 may then transmit this bitstream to video decoder 30 or store this bitstream for later retrieval by video decoder 30.

Video decoder 30 may receive the bitstream representative of encoded video data having been encoded in accordance with the techniques described in this disclosure. Entropy decoding module 150 of video decoder 30 may first determine, for a slice of a current picture of the encoded video data, the number of bits used to specify a set of one or more LSBs of the POC value that identifies an LTRP for use in decoding the current picture. In some examples, the number of bits may be explicitly signaled in the bitstream as a syntax element, e.g. in the slice header, SPS or PPS, as described above. In other examples, the number of bits may be derived as a function of other syntax elements specified in any one or more of the SPS, a PPS and the slice header.

Video decoder 30 may then parse the determined number of bits from the bitstream, where the parsed determined number of bits represents the set of one or more LSBs of the POC value that identifies the long-term reference picture to be used when decoding at least a portion of the current picture. The determined number of bits may specify what has been referred to as the POC LSBs above. Video decoder 30 may then retrieve, from the decoded picture buffer, the LTRP from to be used when decoding at least the portion of the current picture based on the POC LSBs.

To retrieve this LTRP from the decoded picture buffer, video decoder 30 may compare the least significant bits of the POC value that identifies the LTRP to a same number of lease significant bits of a POC value associated with the at least one picture stored in the decoded picture buffer. Video decoder 30 retrieves the one of the at least one pictures stored in the decoded picture buffer for use as the long-term reference picture in decoding the current picture that has the same LSBs for the POC value associated with the one of the at least one pictures stored in the decoded picture buffer as the determined least significant bits of the LTRP to be used to decode the current picture. In other words, video decoder 30 may match the POC LSBs with the least significant bits of POC values for pictures stored in the decoded picture buffer and identify the picture with the matching POC LSBs as the long-term reference picture that is present in the decoded picture buffer but not specified in the SPS associated with the current picture.

Video decoder 30 may then use the long-term reference picture identified by the derived picture order count value to decode the portion of the current picture. In other words, one or more motion vectors specified for a coding unit of the current slice of the current picture may reference the LTRP identified by the POC LSBs. Video decoder 30 may retrieve various blocks of the LTRP identified by these motion vectors, using these various blocks as reference blocks when performing motion compensation. Video decoder 30 may add residual data coded for blocks of the current slice of the current picture to these reference blocks to generate decoded blocks of video data and thereby reconstruct the original video data. Video decoder 30 may store the decoded blocks of video data to the decoded picture buffer for later use in decoding subsequent pictures and/or for display. The video decoder may then decode other slices, if any, of the current picture, similarly as described above.

As noted above, video encoder 20 may specify (or "signal") delta picture order count least significant bits ("delta POC LSBs") or direct POC LSBs in slice headers for current pictures to identify long-term reference pictures present in the decoded picture buffer but not specified in the sequence parameter set (SPS) associated with the current picture. When specifying these (delta) POC LSBs, video encoder 20 commonly analyzes each of these specified (delta) POC LSBs to ensure that one or more of these (delta) POC LSBs are not redundant or the same.

To illustrate, assume video encoder 20 is to specify five long-term reference pictures in the slice header for a slice or other portion of the current picture to be encoded. Moreover, assume that two of these five long-term reference pictures have been specified in the SPS associated with the current picture, leaving the remaining three of the five long-term reference pictures to be signaled as direct POC LSBs for the current picture. Video encoder 20 may signal an index for each of the first two of the five long-term reference pictures, where each index identifies one of the long-term reference pictures specified in the SPS associated with the current picture.

Video encoder 20 may, under these assumptions, specify the following in the slice header to signal the long-term reference pictures to be used when decoding the current picture (where typically it is required that all slice headers of a picture shall have the same reference picture set signaling):

| 1: | indexA | //identifies a POC value of $4001_{10}$ |
| 2: | indexB | //identifies a POC value of $4010_{10}$ |
| 3: | $POCLSB_A$ | //identifies a POC value of $5001_{10}$ |
| 4: | $POCLSB_B$ | //identifies a POC value of $4500_{10}$ |
| 5: | $POCLSB_C$ | //identifies a POC value of $5005_{10}$ |

The following descriptions are based on POC LSBs. However, the same descriptions also apply for delta POC LSBs.

As noted above, each of the above items 1-5 effectively identifies a different POC value. In various instances, however, when only signaling the direct POC LSBs, there may be issues (due to ambiguities) that may prevent video decoder 30 from being able to effectively determine which long-term reference pictures were intended to be used to decode the current slice. Assuming that only three least significant bits are used to signal $POCLSB_A$, then $POCLSB_A$ is equal to $001_2$. Yet, indexA also identifies a POC value of $4001_{10}$, which means that a POC value of $4001_{10}$ is also present in the decoded picture buffer. Given that there are two pictures in the decoded picture buffer having a POC LSB of $001_2$, video decoder 30 may be unable to retrieve any LTRP for the current picture as it is unclear as to which LTRP video decoder 30 was intended to use when decoding the current picture.

As a result, conventional video encoders analyze the POC LSBs for each long-term reference picture signaled in the slice header (including those signaled as an index) to ensure there are no redundancies or ambiguously signaled POC LSBs for each long-term reference picture signaled in the slice header. When an ambiguous delta POC LSBs is identified, these conventional video encoders also encode the most significant bits of each or at least one of the ambiguous POC LSBs, thereby potentially ensuring that each delta POC LSBs signaled in the slice header uniquely identifies a POC value within the context of the slice header. That is, these video encoders may ensure that each of delta POC LSBs uniquely signals a POC value within the set of POC values specified in the slice header.

Yet, ensuring that the POC values signaled in the slice header are uniquely signaled with respect to each other is insufficient to adequately enable the video decoder to retrieve these long-term reference pictures from the decoded picture buffer. To illustrate, consider the above example, but also assume that there is another long-term reference picture in the decoded picture buffer identified by a POC value of $4005_{10}$. When checking to ensure that there is no conflict with any other POC value specified in the slice header, the video encoder determines that this value does not ambiguously signal the POC value of $5005_{10}$ in the context of the other POC values signaled in the slice header and specifying $POCLSB_C$ as $101_2$ (which is simply $5_{10}$) without specifying any of the most significant bits.

Under these assumptions, video decoder 30 would parse $POCLSB_C$ from the bitstream for the current slice and attempts to retrieve the long-term reference picture identified by $POCLSB_C$ ($101_2$ or $5_{10}$). Yet, given that there are two pictures in the decoded picture buffer having a POC LSB of $101_2$, video decoder 30 may be unable to retrieve any LTRP for the current picture as it is unclear as to which LTRP video decoder 30 was intended to use when decoding the current picture.

In accordance with the techniques described in this disclosure, video encoder 20 is configured to analyze each picture present in the entire decoded picture buffer when determining whether it is necessary to signal the additional most significant bits (MSBs) information for disambiguating delta POC LSBs. In other words, video encoder 20 determines POC LSBs (or delta POC LSBs depending on the implementation) for each POC value that identifies a picture in the decoded picture buffer. When performing the analysis of the POC LSBs signaled in the slice header, video encoder 20 determines whether the POC LSBs determined for each of the long-term reference pictures signaled in the slice header is unique with respect to each of the POC LSBs determined for each POC value that identifies a picture in the decoded picture buffer. If one of these POC LSBs signaled in the slice header is determined not to be unique, video encoder 20 may then signal sufficient most significant bits (MSBs) for the POC value so as to enable the POC value of the long-term reference picture to be correctly identified by video decoder 30. In some instances, a number of the one or more least significant bits when added to a number of the one or more most significant bits results in a total that is less than a total number of bits to specify the picture order count value.

In operation, video encoder 20 may determine, for a current picture of the video data, one or more least significant bits of a picture order count value that identifies a long-term reference picture to be used when encoding at least a portion of the current picture. Video encoder 20 may then determine whether these least significant bits are sufficient to unambiguously identify the long-term reference picture from any other reference picture stored to the decoded picture buffer to which the long-term reference picture is also stored (or will be stored depending on the order in which the long-term reference picture is stored in comparison to when this determination is made).

When one or more least significant bits of any other picture order count values that identify any other picture stored to this decoded picture buffer to which the long-term reference picture is also stored are the same as the determined one or more least significant bits of the picture order count value that identifies the long-term reference picture, video encoder 20 may determine one or more most significant bits of the picture order count value that identifies the long-term reference picture to be used when encoding at least the portion of the current picture. Video encoder 20 may then specify both the determined one or more least significant bits and the determined one or more most significant bits of the picture order count value that identifies the long-term reference picture to be used when encoding at least the portion of the current picture in a bitstream representative of an encoded version of the video data. Video encoder 20 may then encode at least the portion of the current picture using the long-term reference picture.

In other words, rather than only determine that the POC LSBs that identify the long-term reference picture are sufficient to uniquely identify the long-term reference picture from any other long-term reference picture specified in the SPS, PPS and/or slice header, video encoder 20 may determine that the POC LSBs that identify the long-term reference picture are sufficient to uniquely identify the long-term reference picture from any other long-term reference picture stored to the entire DPB. Again, a number of the one or more least significant bits when added to a number of the one or more most significant bits results in a total that is less than a total number of bits to specify the picture order count value. In this respect, video encoder 20 may avoid those instances that give rise to issues noted above where the video decoder is unable to correctly identify a long-term reference picture by signaled POC LSBs when two or more long-term reference pictures having the same POC LSBs are stored to the DPB but only one of these long-term reference pictures was specified in the SPS, PPS and/or slice header. As a result, by implementing these techniques, video encoder 20 may more robustly encode the video data in comparison to conventional video encoders that only identify when to more robustly encode the signaled long-term reference picture with respect to those long-term reference pictures signaled in the SPS, PPS and/or slice header.

Video decoder 30 may receive this bitstream representative of the encoded version of the video data (which may also be referred to as "encoded video data"). Video decoder 30 then may determine, for a current picture of this encoded video data, one or more least significant bits of a picture order count that identifies a long-term reference picture to be used when decoding at least a portion of the current picture. These one or more least significant bits may not uniquely identify the picture order count value of the long-term reference picture with respect to the one or more least significant bits of any other picture order count value that identifies any other picture present in a decoded picture buffer to which the long-term reference picture is also stored. As noted above, the least significant bits of the picture order count value may uniquely identify the picture order count value of the long-term reference picture with respect to least significant bits of any other picture order count value computed with respect to a picture order count value that identifies any other long-term reference picture to be used as a candidate for decoding the slice of the current picture.

In other words, the previous analysis performed by conventional video encoders that do not implement the techniques described in this disclosure would not have identified the POC LSBs as being ambiguous given that the POC LSBs for any other long-term reference pictures signaled in the slice header all uniquely identified their respective long-term reference pictures. Yet, this does not mean that the POC LSBs uniquely identify the long-term reference pictures with respect to the entire decoded picture buffer. Because video encoder 20 has been modified to implement the techniques described in this disclosure, in accordance with an example of this disclosure, video encoder 20 extends this analysis to consider each and every picture stored to the decoded picture buffer. As a result, video encoder 20 may, as described above, additionally signal the POC MSBs even though the POC LSBs are unique for a given subset of pictures stored to the decoded picture buffer (e.g., the subset signaled in the slice header).

In this respect, even when the POC LSBs are unique for a given subset of the pictures stored to the decoded picture buffer, video decoder 30 determines one or more most significant bits of the picture order count value that identifies the long-term reference picture. The one or more most significant bits in combination with the determined one or more least significant bits is sufficient to distinguish the picture order count (POC) value that identifies the long-term reference picture from any other picture order count value that identifies any other picture in the decoded picture buffer.

Video decoder 30 may then retrieve the long-term reference picture from the decoded picture buffer based on the determined one or more least significant bits of the picture order count value and the determined one or more most significant bits of the picture order count value.

Video decoder 30 may then use the long-term reference picture identified by the derived picture order count value to decode the portion of the current picture. In other words, one or more motion vectors specified for a coding unit of the current slice of the current picture may reference the long-term reference picture identified by the derived picture order count value. The video decoder may retrieve various blocks of the long-term reference picture identified by these motion vectors, using these various blocks as reference blocks when performing motion compensation. The video decoder may add residual data coded for blocks of the current slice of the current picture to these reference blocks to generate decoded blocks of video data. The video decoder may store the decoded blocks of video data to the decoded picture buffer for later use in decoding subsequent pictures and/or for display. The video decoder may then decode other portions, if any, of the current picture, similarly as described above.

Figure 2:
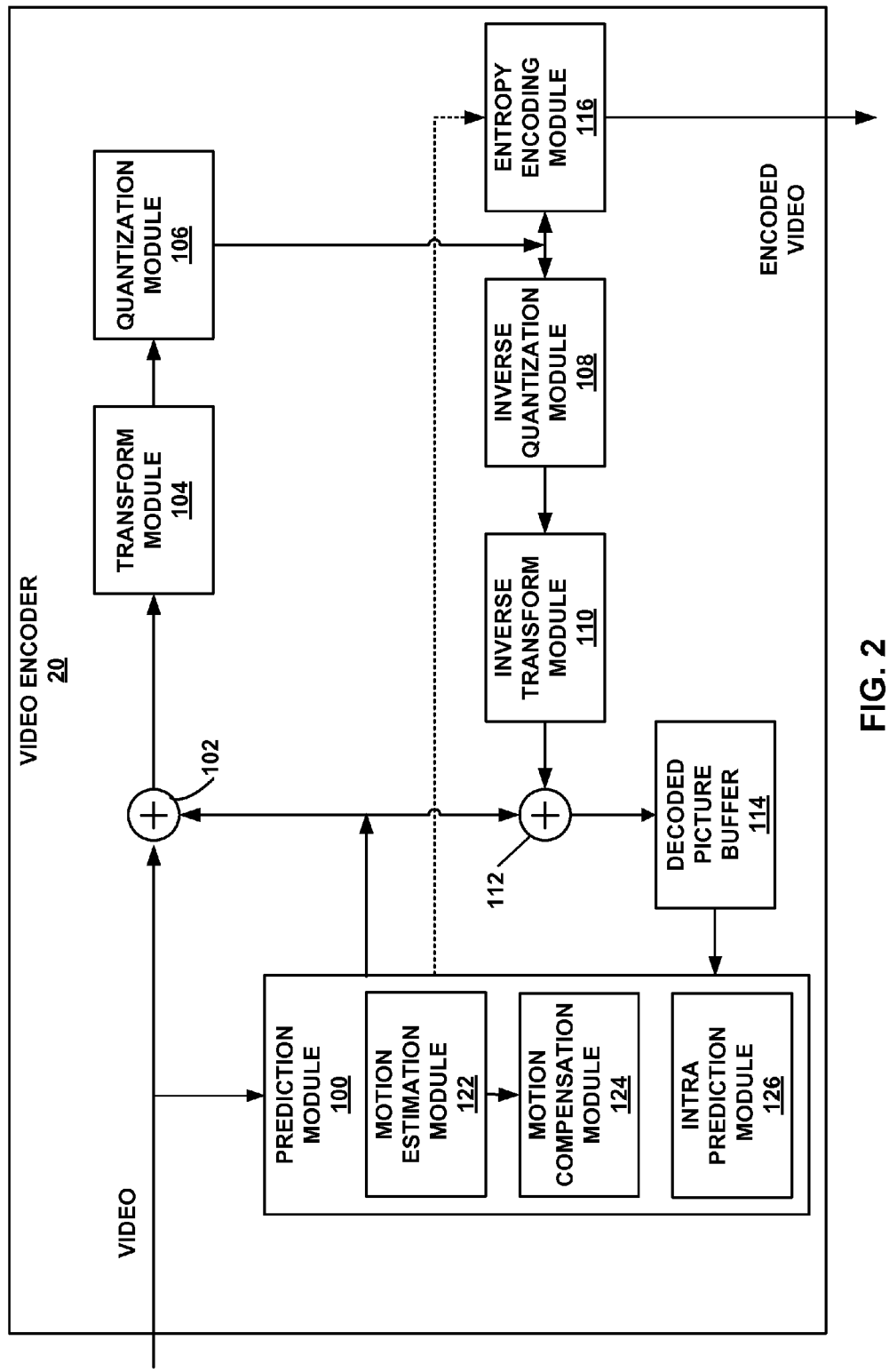
FIG. 2 is a block diagram illustrating an example of a video encoder that may implement techniques for coding video data.

FIG. 2 is a block diagram that illustrates an example configuration of video encoder 20 that is configured to implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may, as noted above, be applicable to other coding standards or methods.

In the example of FIG. 2, video encoder 20 includes a plurality of functional components. The functional components of video encoder 20 include a prediction module 100, a residual generation module 102, a transform module 104, a quantization module 106, an inverse quantization module 108, an inverse transform module 110, a reconstruction module 112, and a decoded picture buffer 114, and an entropy encoding module 116. Prediction module 100 includes a motion estimation module 122, a motion compensation module 124, and an intra-prediction module 126.

Figure 4:
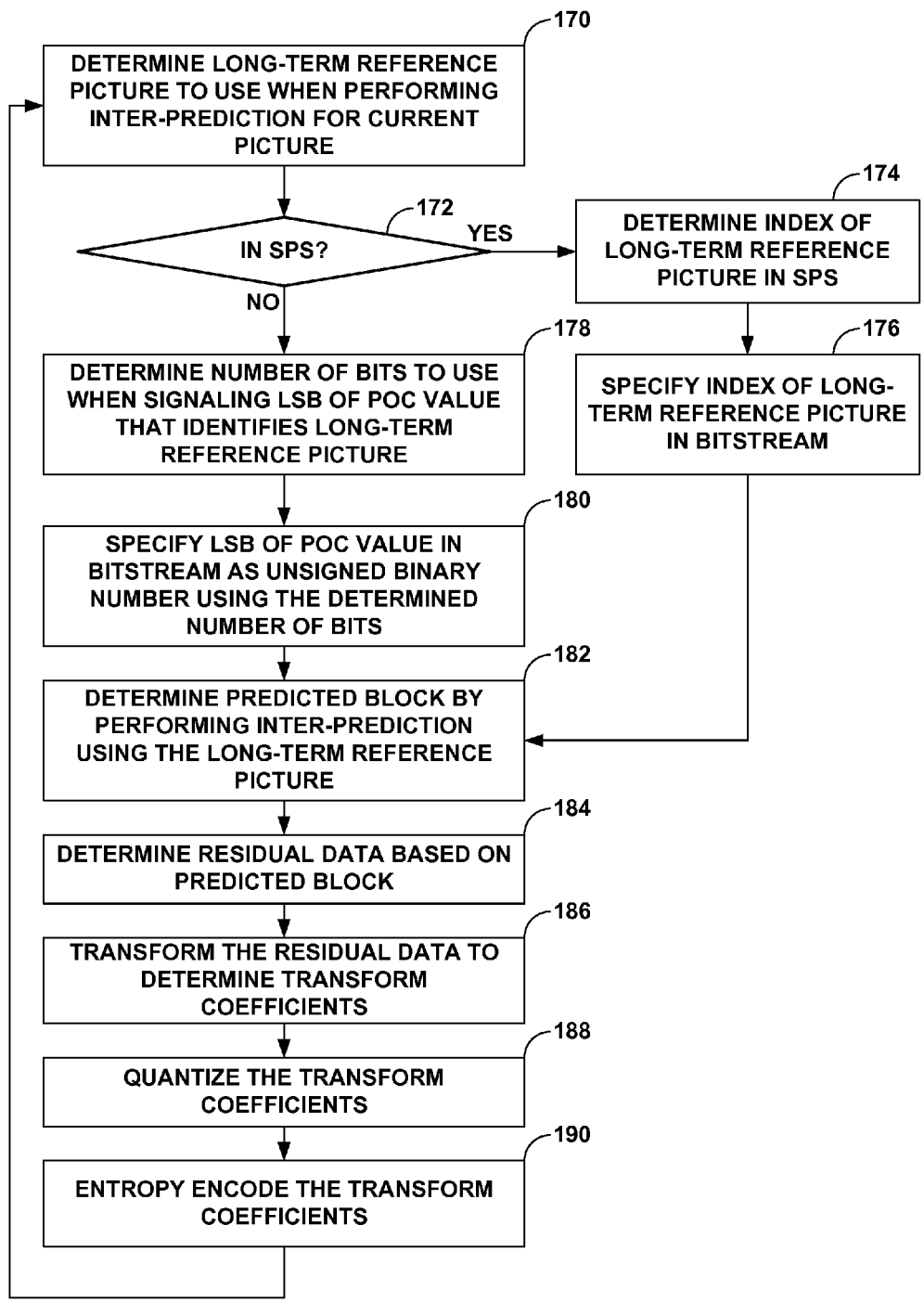
FIG. 4 is a flowchart illustrating exemplary operation of a video encoder in performing the first aspect of the techniques described in this disclosure.

In other examples, video encoder 20 may include more, fewer, or different functional components. For example, video encoder 20 may include a deblocking filter to filter the output of reconstruction module 112 to remove blockiness artifacts from reconstructed video. Furthermore, motion estimation module 122 and motion compensation module 124 may be highly integrated, but are represented in the example of FIG. 4 separately for purposes of explanation.

Video encoder 20 may receive video data. In various examples, video encoder 20 may receive the video data from various sources. For example, video encoder 20 may receive the video data from video source 18 (FIG. 1) or another source. The video data may represent sequences of pictures. The pictures may include texture view and depth views. To encode the video data, video encoder 20 may perform an encoding operation on each sequence of pictures. As part of performing the encoding operation on a sequence of pictures, video encoder 20 may perform encoding operations on each picture within the sequence of pictures. As part of performing the encoding operation on a picture, video encoder 20 may perform encoding operations on each slice in the picture. When video encoder 20 performs an encoding operation on a slice, video encoder 20 generates a coded slice. The coded slice is the slice in its encoded form. The coded slice may include a slice header and slice data. The slice header may contain syntax elements associated with the slice.

As part of performing an encoding operation on a slice, video encoder 20 may perform encoding operations on treeblocks in the slice. When video encoder 20 performs an encoding operation on a treeblock, video encoder 20 may generate a coded treeblock. The coded treeblock may comprise data representing an encoded version of a treeblock. In other words, the coded treeblock may be a treeblock in its encoded form. The techniques, while described above with respect to H.264/AVC, may as described below also be applied with respect to HEVC. In this respect, the techniques should not be limited to either of H.264 or HEVC, but may be applied both in the context of H.264/AVC and HEVC.

As part of performing an encoding operation on a treeblock, prediction module 100 may perform quadtree partitioning on the treeblock to divide the treeblock into progressively smaller CUs. For example, prediction module 100 may partition a treeblock into four equally-sized sub-CUs, partition one or more of the sub-CUs into four equally-sized sub-sub-CUs, and so on.

The sizes of the CUs may range from 8×8 pixels up to the size of the treeblock with a maximum of 64×64 pixels or greater. In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value.

As part of performing the encoding operation for a treeblock, prediction module 100 may generate a hierarchical quadtree data structure for the treeblock. For example, a treeblock may correspond to a root node of the quadtree data structure. If prediction module 100 partitions the treeblock into four sub-CUs, the root node has four child nodes in the quadtree data structure. Each of the child nodes corresponds to one of the sub-CUs. If prediction module 100 partitions one of the sub-CUs into four sub-sub-CUs, the node corresponding to the sub-CU may have four child nodes, each of which corresponds to one of the sub-sub-CUs.

Each node of the quadtree data structure may provide syntax data for the corresponding CU. For example, a node in the quadtree may include a split flag, indicating whether the CU corresponding to the node is partitioned (i.e., split) into four sub-CUs. Syntax elements for a CU may be defined recursively, and may depend on whether the CU is split into sub-CUs. A CU that is not partitioned may correspond to a leaf node in the quadtree data structure. A leaf node in the quadtree data structure may be referred to as a "coding node." A coded treeblock may include data based on the quadtree data structure for a corresponding treeblock. A coded treeblock is a treeblock in its encoded form. A coded treeblock corresponds to a treeblock when the coded treeblock is the treeblock in its encoded form.

Video encoder 20 may perform encoding operations on each non-partitioned CU of the treeblock. When video encoder 20 performs an encoding operation on a non-partitioned CU, video encoder 20 generates data representing an encoded version of the non-partitioned CU.

As part of performing an encoding operation on a CU, motion estimation module 122 and motion compensation module 124 may perform inter prediction on the CU. In other words, motion estimation module 122 and motion compensation module 124 may generate prediction data for the CU based on decoded samples of reference pictures other than the picture that contains the CU. Inter prediction may provide temporal compression.

To perform inter prediction on a CU, motion estimation module 122 may partition the CU into one or more prediction units (PUs). Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, motion estimation module 122 may partition a CU into PUs along a boundary that does not meet the sides of the CU at right angles.

Motion estimation module 122 may perform a motion estimation operation with regard to each PU of a CU. When motion estimation module 122 performs a motion estimation operation with regard to a PU, motion estimation module 122 may generate one or more motion vectors for the PU. For instance, slices may be I slices, P slices, or B slices. Motion estimation module 122 and motion compensation module 124 may perform different operations for a PU of a CU depending on whether the CU is in an I slice, a P slice, or a B slice. In an I slice, all CUs are intra predicted. Hence, if the CU is in an I slice, motion estimation module 122 and motion compensation module 124 do not perform inter prediction on the CU.

If the CU is in a P slice, the picture containing the CU is associated with a list of reference pictures referred to as "list 0." Each of the reference pictures in list 0 contains samples that may be used for inter prediction of subsequent pictures in decoding order. When motion estimation module 122 performs the motion estimation operation with regard to a PU in a P slice, motion estimation module 122 searches the reference pictures in list 0 for a reference sample for the PU. The reference sample of the PU may be a set of pixel values that most closely corresponds to the pixels values of the PU. Motion estimation module 122 may use a variety of metrics to determine how closely a set of pixel values in a reference picture corresponds to the pixel values of a PU. For example, motion estimation module 122 may determine how closely a set of pixel values in a reference picture corresponds to the pixel values of a PU by sum of absolute difference (SAD), sum of square difference (SSD), or other difference metrics.

After identifying a reference sample of a PU of a CU in a P slice, motion estimation module 122 may generate a reference index that indicates the reference picture in list 0 containing the reference sample and a motion vector that indicates a spatial displacement between the PU and the reference sample. In various examples, motion estimation module 122 may generate motion vectors to varying degrees of precision. For example, motion estimation module 122 may generate motion vectors at one-quarter pixel precision, one-eighth pixel precision, or other fractional pixel precision. Motion estimation module 122 may output motion information for the PU to entropy encoding module 56 and motion compensation module 124. The motion information for the PU may include the reference index and the motion vector of the PU. Motion compensation module 124 may use the motion information of PUs of the CU to identify and retrieve the reference samples of the PUs. Motion compensation module 124 may then use pixel values of reference samples of PUs to generate the prediction data for the CU.

If the CU is in a B slice, the picture containing the CU may be associated with two lists of reference pictures, referred to as "list 0" and "list 1." Each of the reference pictures in list 0 contains samples that may be used for inter prediction of subsequent pictures in decoding order. The reference pictures in list 1. occur before the picture in decoding order but after the picture in presentation order. In some examples, a picture containing a B slice may be associated with a list combination that is a combination of list 0 and list 1.

Furthermore, if the CU is in a B slice, motion estimation module 122 may perform uni-directional prediction or bi-directional prediction for PUs of the CU. When motion estimation module 122 performs uni-directional prediction for a PU, motion estimation module 122 may search the reference pictures of list 1. for a reference sample for the PU. Motion estimation module 122 may then generate a reference index that indicates the reference picture in list 1. that contains the reference sample and a motion vector that indicates a spatial displacement between the PU and the reference sample. Motion estimation module 122 may output motion information for PUs of the CU to entropy encoding module 56 and motion compensation module 124. The motion information for the PU may include the reference index, a prediction direction indicator, and the motion vector of the PU. The prediction direction indicator may indicate whether the reference index indicates a reference picture in list 0 or list 1. Motion compensation module 124 may use the motion information of PUs of the CU to identify and retrieve the reference samples of the PUs. Motion compensation module 124 may then use pixel values of reference samples of PUs to generate the prediction data for the CU.

When motion estimation module 122 performs bi-directional prediction for a PU, motion estimation module 122 may search the reference pictures in list 0 for a reference sample for the PU and may also search the reference pictures in list 1. for another reference sample for the PU. Motion estimation module 122 may then generate reference indexes that indicate the reference samples and motion vectors that indicate spatial displacements between the reference samples and the PU. Motion estimation module 122 may output motion information of the PU to entropy encoding module 116 and motion compensation module 124. The motion information for the PU may include the reference indexes and the motion vectors of the PU. Motion compensation module 124 may use the motion information to identify and retrieve the reference samples of the PUs. Motion compensation module 124 may then interpolate pixel values of the prediction data of the CU from pixel values in the reference samples of the PUs of the CU.

Generally, prediction module 100 may implement the techniques described in this disclosure to form the above noted RPS and generate the SPS and/or slice level syntax elements identifying reference pictures in the RPS. Prediction module 100 may represent a hardware or combination hardware and software unit (which may be included within a larger hardware or combination hardware and software unit) that implements the techniques described in more detail above.

As part of performing an encoding operation on a CU, intra prediction module 126 may perform intra prediction on the CU. In other words, intra prediction module 126 may generate prediction data for the CU based on decoded pixel values of other CUs. Intra prediction may provide spatial compression.

To perform intra prediction on a CU, intra prediction module 126 may use multiple intra prediction modes to generate multiple sets of prediction data for the CU. When intra prediction module 126 uses an intra prediction mode to generate a set of prediction data for a CU, intra prediction module 126 may partition the CU into one or more PUs. Intra prediction module 126 may then, for each of the PUs, extend pixel values from neighboring PUs across the PU in a direction and/or gradient associated with the intra prediction mode. The neighboring PUs may be above, above and to the right, above and to the left, or to the left of the PU, assuming a left-to-right, top-to-bottom encoding order for PUs, CUs and treeblocks. Intra prediction module 46 may use various numbers of intra prediction modes, e.g., 33 directional intra prediction modes, depending on the size of the CU.

Intra prediction module 126 may select one of the sets of prediction data for the CU. In various examples, intra prediction module 126 may select the set of prediction data for the CU in various ways. For example, intra prediction module 126 may select the set of prediction data for the CU by calculating distortion rates for the sets of prediction data and selecting the set of prediction data that has the lowest distortion rate.

Prediction module 100 may select the prediction data for a CU from among the prediction data generated by motion compensation module 124 for the CU or the prediction data generated by intra prediction module 126 for the CU. In some examples, prediction module 100 selects the prediction data for the CU based on error (i.e., distortion) in the sets of prediction data.

After prediction module 100 selects the prediction data for a CU, residual generation module 102 may generate residual data for the CU by subtracting the selected prediction data of the CU from the pixel values of the CU. The residual data of a CU may include 2D residual blocks that correspond to different pixel components of the pixels in the CU. For example, the residual data may include a residual block that corresponds to differences between luminance components of pixels in the prediction data of the CU and luminance components of pixels in the original pixels of the CU. In addition, the residual data of the CU may include residual blocks that correspond to the differences between chrominance components of pixels in the prediction data of the CU and the chrominance components of the original pixels of the CU.

A CU may have one or more transform units (TUs). Each TU of a CU may correspond to a different portion of the residual data of the CU. The sizes of the TUs of a CU may or may not be based on the sizes of PUs of the CU. In some examples, a CU may be subdivided into smaller units using a quadtree structure known as a "residual quad tree" (RQT). The TUs may correspond to leaf nodes of the RQT.

Transform module 104 may generate one or more coefficient blocks for each TU of a CU by applying a transform to the residual data corresponding to the TU. Each of the coefficient blocks may be a 2D matrix of coefficients. In various examples, transform module 104 may apply various transforms to the residual data corresponding to a TU. For example, transform module may apply a discrete cosine transform (DCT), a directional transform, or a conceptually similar transform.

After transform module 104 generates a coefficient block for a TU, quantization module 106 may quantize the coefficients in the coefficient block. Quantization generally refers to a process in which coefficients in a coefficient block are quantized to possibly reduce the amount of data used to represent the coefficients, providing further compression. Quantization may reduce the bit depth associated with some or all of the coefficients. For example, an n-bit value may be rounded down to an m-bit value during quantization, where n is greater than m.

Inverse quantization module 108 and inverse transform module 110 may apply inverse quantization and inverse transformation to the coefficient block, respectively, to reconstruct residual data from the coefficient block. Reconstruction module 112 may add the reconstructed residual data to the prediction data generated by motion compensation module 124 or intra prediction module 126 to produce a reconstructed video block for storage in decoded picture buffer 114. Motion estimation module 122 and motion compensation module 124 may use a reference picture that contains the reconstructed video block to perform inter prediction on CUs of subsequent pictures. In addition, intra prediction module 126 may use reconstructed pixel values of CUs of the current picture to perform intra prediction.

Entropy encoding module 116 may receive data from other functional components of video encoder 20. For example, entropy encoding module 116 may coefficient blocks from quantization module 106 and may receive syntax elements from prediction module 100. When entropy encoding module 116 receives data, entropy encoding module 116 may perform one or more entropy encoding operations to generate entropy encoded data. For example, video encoder 20 may perform a context adaptive variable length coding (CAVLC) operation, a CABAC operation, a syntax-based context-adaptive binary arithmetic coding (SBAC) operation, a Probability Interval Partitioning Entropy (PIPE) coding operation, or another type of entropy encoding operation on the data.

Entropy encoding module 116 outputs a bitstream that includes a series of NAL units. As discussed above, each of the NAL units may be a syntax structure containing an indication of a type of data in the NAL unit and bytes containing the data. Each coded slice NAL unit in the bitstream contains a coded slice. A coded slice includes a coded slice header and slice data. The slice data may include coded treeblocks. The coded treeblocks may include one or more coded CUs. Each coded CU may include one or more entropy-encoded coefficient blocks. Entropy encoding module 116 may output the bitstream for either real-time or near-real-time decoding or for storage and later decoding by decoder 30.

As described above, video encoder 20 may encode video data in accordance with the first aspects of the techniques of this disclosure. To encode video data in accordance with the first aspect of the techniques, motion estimation module 122 of video encoder 20 may determine, for a current picture of the video data, a long term reference picture to be used when encoding at least a portion of a current picture of the video data in the manner described above. In some instances, this long-term reference picture is a long-term reference picture that is present in decoded picture buffer 114 but that is not specified as one or more long-term reference pictures in a sequence parameter set associated with the current picture.

Motion estimation module 122 may then determine a number of bits to be used to represent one or more LSBs of a POC value that identifies the long-term reference picture in a bitstream representative of an encoded version of the video data. In other words, motion estimation module 122 may determine the "v" in the unsigned binary encoding denoted as "u(v)" with the "u," again denoting unsigned binary encoding. Often, this number of LSBs is defined based on the number of LSBs required to disambiguate the LTRP from other LTRPs or any other reference picture stored to the DPB. In other words, this number may vary on a slice, picture or GOP basis. In some instances, the number of LSBs may be defined for an entire bitstream, or portions thereof. In some instances, the number of LSBs used to identify this difference is statically or pre-defined, such as in the HEVC standard. In some instances, the number of LSBs used to identify the LTRP may be derived based on syntax elements determined for the current picture and/or previously encoded pictures of the video data, where motion estimation module 122 may then not need to signal the number of bits used to represent this POC LSB given that motion estimation module 122 may perform a similar derivation process to derive the "v" number of bits used to represent the POC LSB.

In any event, motion estimation module 122 may then pass these one or more LSBs of the POC value to entropy encoding module 116, which may specify the one or more LSBs of the POC value that identifies the LTRP in the bitstream using the determined number of bits used to represent the one or more least significant bits of the picture order count value that identifies the long-term reference picture. In other words, entropy encoding module 116 may specify the POC LSBs noted above in the bitstream using the "v" number of bits as an unsigned binary number. Typically, entropy encoding module 116 specifies the one or more least significant bits of the picture order count value that identifies the long-term reference picture in a slice header associated with at least the portion of the current picture.

In some instances, motion estimation module 122 determines the number of bits to be used to represent the one or more least significant bits of the picture order count value that identifies the long-term reference picture in the bitstream based on syntax elements previously determined for one or more of the current picture and previously encoded pictures of the video data so as to avoid specifying in the bitstream the determined number of bits to be used to represent the one or more least significant bits of the picture order count value that identifies the long-term reference picture. In some instances, such as when the "v" number of bits is not derived from other syntax elements (often as an implementation choice), entropy encoding module 116 also specifies the determined number of bits used to represent the one or more least significant bits of the picture order count value that identifies the long-term reference picture in the bitstream. The various modules of video encoder 20, including motion estimation module 122, motion compensation unit 124, summer 102, transform module 104, quantization module 106 and entropy encoding module 116, may then encode at least the portion of the current picture using the LTRP.

Video encoder 20 may also implement the second aspect of the techniques described in this disclosure potentially in conjunction with the first aspect of the techniques described in this disclosure. In accordance with the second aspect of the techniques, motion estimation module 122 may determine, for the current picture of the video data, one or more least significant bits of a picture order count value that identifies a long-term reference picture to be used when encoding at least a portion of the current picture. Motion estimation module 122 may then determine whether these least significant bits are sufficient to unambiguously identify the long-term reference picture from any other reference picture stored to decoded picture buffer 114 to which the long-term reference picture is also stored (or will be stored depending on the order in which the long-term reference picture is stored in comparison to when this determination is made).

Motion estimation module 122 may determine whether these least significant bits are sufficient to unambiguously identify the long-term reference picture from any other reference picture stored to decoded picture buffer 114 by, at least in part, determining the least significant bits for at least one picture order count value that identifies a respective one of the other pictures stored to decoded picture buffer 114. Motion estimation module 122 may then determine whether the least significant bits for this picture order count value is the same as the determined least significant bits of the picture order count value that identifies the long-term reference picture. If these two picture order count value least significant bits are the same, motion estimation module 122 may then determine that the least significant bits of the picture order count value that identifies the long-term reference picture to be used when encoding and decoding at least the portion of the current picture are insufficient to uniquely identify the appropriate long-term reference picture. If, however, these two picture order count value least significant bits are not the same, motion estimation module 122 may continue to determine least significant bits of picture order count values that identify another long-term reference picture stored to decoded picture buffer 114, comparing the two picture order count least significant bits until either a match is found or all picture order count values that identify pictures stored to decoded picture buffer 114 have undergone this comparison.

When one or more least significant bits of any other picture order count values that identify any other picture stored to decoded picture buffer 114 to which the long-term reference picture is also stored are the same as the determined one or more least significant bits of the picture order count value that identifies the long-term reference picture, motion estimation module 122 may determine one or more most significant bits of the picture order count value that identifies the long-term reference picture to be used when encoding at least the portion of the current picture. To determine the one or more most significant bits of the picture order count value, motion estimation module 122 may determine the most significant bits of the picture order count value that identifies the long-term reference picture to be used when encoding at least the portion of the current picture such that the most significant bits in combination with the determined least significant bits are sufficient to uniquely identify the picture order count value that identifies the long-term reference picture from any other picture order count value that identifies any other picture in the decoded picture buffer.

Motion estimation module 122 may then forward these least significant bits and most significant bits to entropy encoding module 116. Entropy encoding module 116 may specify both the determined one or more least significant bits and the determined one or more most significant bits of the picture order count value that identifies the long-term reference picture to be used when encoding at least the portion of the current picture in a bitstream representative of an encoded version of the video data. The various modules of video encoder 20, including motion estimation module 122, motion compensation unit 124, summer 102, transform module 104, quantization module 106 and entropy encoding module 116, may then encode at least the portion of the current picture using the LTRP.

In other words, rather than only determine that the POC LSBs that identify the long-term reference picture are sufficient to uniquely identify the long-term reference picture from any other long-term reference picture specified in the SPS, PPS and/or slice header, motion estimation module 122 may determine that the POC LSBs that identify the long-term reference picture are sufficient to uniquely identify the long-term reference picture from any other long-term reference picture stored to decoded picture buffer 114. In this respect, video encoder 20 may avoid those instances that give rise to issues noted above where the video decoder is unable to correctly identify a long-term reference picture by signaled POC LSBs when two or more long-term reference pictures having the same POC LSBs are stored to the DPB but only one of these long-term reference pictures was specified in the SPS, PPS and/or slice header. As a result, by implementing these techniques, video encoder 20 may more robustly encode the video data in comparison to conventional video encoders that only identify when to more robustly encode the signaled long-term reference picture with respect to those long-term reference pictures signaled in the SPS, PPS and/or slice header.

Figure 3:
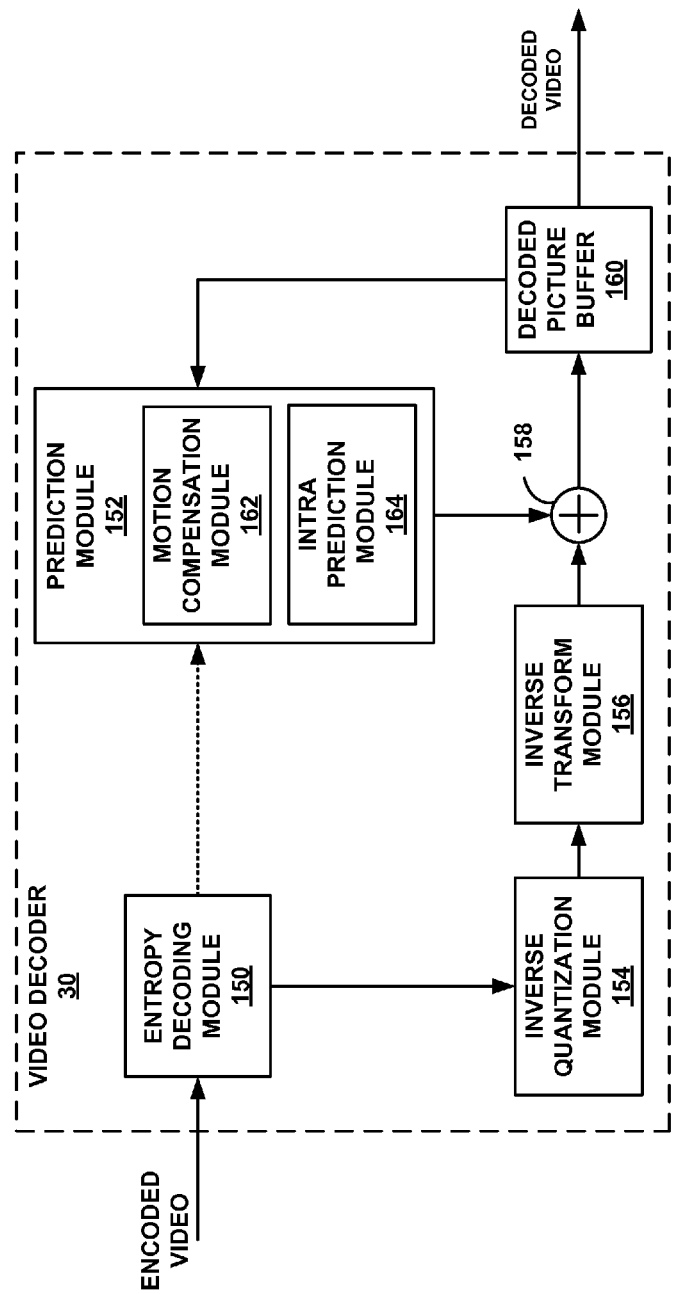
FIG. 3 is a block diagram illustrating an example of a video decoder, which decodes an encoded video sequence.

FIG. 3 is a block diagram that illustrates an example configuration of video decoder 30. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes a plurality of functional components. The functional components of video decoder 30 include an entropy decoding module 150, a prediction module 152, an inverse quantization module 154, an inverse transform module 156, a reconstruction module 158, and a decoded picture buffer 160. Prediction module 152 includes a motion compensation module 162 and an intra prediction module 164. In some examples, video decoder 30 may perform a decoding pass generally reciprocal to the encoding pass described with respect to video encoder 20 of FIG. 2. In other examples, video decoder 30 may include more, fewer, or different functional components. For example, video decoder 30 may include a deblocking filter to filter the output of reconstruction module 158 to remove blockiness artifacts from reconstructed video.

Video decoder 30 may receive a bitstream that comprises encoded video data. When video decoder 30 receives the bitstream, entropy decoding module 150 performs a parsing operation on the bitstream. As a result of performing the parsing operation on the bitstream, entropy decoding module 150 may generate entropy-decoded syntax elements. The entropy-decoded syntax elements may include entropy-decoded coefficient blocks. Prediction module 152, inverse quantization module 154, inverse transform module 156, and reconstruction module 158 may perform a decoding operation that uses the syntax elements to generate decoded video data.

In some examples, entropy decoding module 150 may parse the syntax elements related to the bits of a picture order count used for identifying reference pictures and forming reference picture sets in accordance with various aspects of the techniques described in more detail above. Entropy decoding module 150 may provide these syntax element to prediction module 152, which may implement the techniques described in this disclosure to determine the picture order count from the bits, form a reference picture set that includes a reference picture associated with or identified by the picture order count and decode one or more encoded pictures of the video data using the reference picture set.

As discussed above, the bitstream may comprise a series of NAL units. The NAL units of the bitstream may include sequence parameter set NAL units, picture parameter set NAL units, SEI NAL units, and so on. As part of performing the parsing operation on the bitstream, entropy decoding module 150 may perform parsing operations that extract and entropy decode sequence parameter sets from sequence parameter set NAL units, picture parameter sets from picture parameter set NAL units, SEI data from SEI NAL units, and so on. A sequence parameter set is a syntax structure that contains syntax elements that apply to zero or more entire coded video sequences. A picture parameter set is a syntax structure containing syntax elements that apply to zero or more entire coded pictures. A picture parameter set associated with a given picture may include a syntax element that identifies a sequence parameter set associated with the given picture.

In addition, the NAL units of the bitstream may include coded slice NAL units. As part of performing the parsing operation on the bitstream, entropy decoding module 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding module 150 may perform an entropy decoding operation, such as a CAVLC decoding operation, on the coded slice header to recover the slice header.

After extracting the slice data from coded slice NAL units, entropy decoding module 150 may extract coded treeblocks from the slice data. Entropy decoding module 150 may then extract coded CUs from the coded treeblocks. Entropy decoding module 150 may perform parsing operations that extract syntax elements from the coded CUs. The extracted syntax elements may include entropy-encoded coefficient blocks. Entropy decoding module 150 may then perform entropy decoding operations on the syntax elements. For instance, entropy decoding module 150 may perform CABAC operations on the coefficient blocks.

When entropy decoding module 150 performs an entropy decoding operation on a set of data, entropy decoding module 150 may select a context model. In examples where entropy decoding module 150 uses CABAC, the context model may indicate probabilities of particular bins. In examples where entropy decoding module 150 uses CAVLC, the context model may indicate a mapping between codewords and the corresponding data. Entropy decoding module 150 may then use the selected context model to perform the entropy decoding operation on the set of data. After entropy decoding module 150 performs a parsing operation on a non-partitioned CU, video decoder 30 may perform a decoding operation on the non-partitioned CU. To perform the decoding operation on a non-partitioned CU, video decoder 30 may, at each level of the residual quadtree of the CU, perform a decoding operation on each TU of the CU. By performing the decoding operation for each TU of the CU, video decoder 30 may reconstruct the residual data of the CU.

As part of performing a decoding operation on a non-partitioned TU, inverse quantization module 154 may inverse quantize, i.e., de-quantize, the coefficient blocks associated with the TU. Inverse quantization module 154 may inverse quantize the coefficient blocks in a manner similar to the inverse quantization processes proposed for HEVC or defined by the H.264 decoding standard. Inverse quantization module 154 may use a quantization parameter QPY calculated by video encoder 20 for a CU of the coefficient block to determine a degree of quantization and, likewise, a degree of inverse quantization for inverse quantization module 154 to apply.

After inverse quantization module 154 inverse quantizes a coefficient block, inverse transform module 156 may generate residual data for the TU associated with the coefficient block. Inverse transform module 156 may generate the residual data for the TU at least in part by applying an inverse transform to the coefficient block. For example, inverse transform module 156 may apply an inverse DCT, an inverse integer transform, an inverse Karhunen-Loeve transform (KLT), an inverse rotational transform, an inverse directional transform, or another inverse transform to the coefficient block. In some examples, inverse transform module 156 may determine an inverse transform to apply to the coefficient block based on signaling from video encoder 20. In such examples, inverse transform module 156 may determine the inverse transform based on a signaled transform at the root node of a quadtree for a treeblock associated with the coefficient block. In other examples, inverse transform module 156 may infer the inverse transform from one or more coding characteristics, such as block size, coding mode, or the like. In some examples, inverse transform module 156 may apply a cascaded inverse transform.

If the CU was encoded using inter prediction, motion compensation module 162 may perform motion compensation to generate prediction data for the CU. Motion compensation module 162 may use motion information for the PUs of the CU to identify reference samples for the PUs. The motion information for a PU may include a motion vector, a reference picture index, and a prediction direction. Motion compensation module 162 may then use the reference samples for the PUs to generate prediction data for the CU.

In some examples, motion compensation module 162 may refine the prediction data for a CU by performing interpolation based on interpolation filters. Identifiers for interpolation filters to be used for motion compensation with sub-pixel precision may be included in the syntax elements. Motion compensation module 162 may use the same interpolation filters used by video encoder 20 during generation of the prediction data of the CU to calculate interpolated values for sub-integer pixels of a reference block. Motion compensation module 162 may determine the interpolation filters used by video encoder 20 according to received syntax information and use the interpolation filters to produce prediction data.

If a CU is encoded using intra prediction, intra prediction module 164 may perform intra prediction to generate prediction data for the CU. For example, intra prediction module 164 may determine an intra prediction mode for the CU based on syntax elements in the bitstream. Intra prediction module 164 may then use the intra prediction mode to generate prediction data (e.g., predicted pixel values) for the CU based on the pixel values of neighboring CUs.

Reconstruction module 158 may use the residual data of a CU and the prediction data for the CU to reconstruct pixel values for the CU. In some examples, video decoder 30 may apply a deblocking filter to remove blockiness artifacts from the reconstructed pixel values filter of a slice or picture. Decoded picture buffer 160 may store the decoded pixel values for pictures of the video data. Decoded picture buffer 160 may provide reference pictures for subsequent motion compensation, intra prediction, and presentation on a display device, such as display device 32 of FIG. 1.

As described above, video decoder 30 may implement or be configured to perform the first aspect of the techniques described above. Entropy decoding module 150 of video decoder 30 may receive the bitstream representative of encoded video data having been encoded in accordance with the first aspect of the techniques described in this disclosure. Entropy decoding module 150 may first determine, for a portion of a current picture of the encoded video data, the number of bits used to specify one or more LSBs of the POC value that identifies a LTRP for use in decoding the current picture. In some examples, the number of bits may be explicitly signaled in the bitstream as a syntax element, e.g. in the slice header, as described above. In other examples, entropy decoding module 150 may derive the number of bits as a function of other syntax elements specified in any one or more of the SPS, a picture parameter set (PPS) and the slice header.

Entropy decoding module 150 may then parse the determined number of bits from the bitstream, where the parsed determined number of bits represents the one or more LSBs of the POC that identifies the LTRP. Often, the picture order count value that identifies the long-term reference picture is a picture order count value that identifies a long-term reference picture that is present in decoded picture buffer 160 but that is not specified as one or more long-term reference pictures in a sequence parameter set associated with the current picture. The determined number of bits may specify what has been referred to as the POC LSBs above. Entropy decoding module 150 may pass the POC value LSBs to motion compensation module 162. Motion compensation module 162 may then retrieve, from the decoded picture buffer 160, the LTRP to be used when decoding at least the portion of the current picture based on the POC LSBs.

To retrieve this LTRP from the decoded picture buffer, motion compensation module 162 may compare the least significant bits of the POC value that identifies the LTRP to a same number of least significant bits of a POC value associated with the at least one picture stored to decoded picture buffer 160. Motion compensation module 162 retrieves the one of the at least one pictures stored to decoded picture buffer 160 for use as the long-term reference picture in decoding the current picture that has the same LSBs for the POC value associated with the one of the at least one pictures stored to decoded picture buffer 160 as the determined least significant bits of the LTRP to be used to decode the current picture. In other words, motion compensation module 162 may match the POC LSBs with the least significant bits of POC values for pictures stored in decoded picture buffer 160 and identify the picture with the matching POC LSBs as the long-term reference picture that is present in decoded picture buffer 160 but not specified in the SPS associated with the current picture.

Motion compensation module 162 may then use the long-term reference picture identified by the derived picture order count value to decode the portion of the current picture. In other words, one or more motion vectors specified for a coding unit of the current slice of the current picture may reference the LTRP identified by the POC LSBs. Motion compensation module 162 may retrieve various blocks of the LTRP identified by these motion vectors, using these various blocks as reference blocks when performing motion compensation. Video decoder 30 may add residual data coded for blocks of the current slice of the current picture to these reference blocks to generate decoded blocks of video data and thereby reconstruct the original video data, as described above. Video decoder 30 may store the decoded blocks of video data to decoded picture buffer 160 for later use in decoding subsequent pictures. The video decoder may then decode other slices, if any, of the current picture, similarly as described above.

Video decoder 30 may also implement the second aspects of the techniques described in this disclosure potentially in conjunction with the first aspect of the techniques described in this disclosure. In accordance with the second aspects of the techniques, entropy decoding module 150 may determine, for a current picture of this encoded video data, least significant bits of a picture order count value that identifies a long-term reference picture to be used when decoding at least a portion of the current picture. These one or more least significant bits may not uniquely identify the picture order count value of the long-term reference picture with respect to the one or more least significant bits of any other picture order count value that identifies any other picture present in decoded picture buffer 160 to which the long-term reference picture is also stored. As noted above, the least significant bits of the picture order count value may uniquely identify the picture order count value of the long-term reference picture with respect to least significant bits of any other picture order count value determined with respect to a picture order count value that identifies any other long-term reference picture to be used as a candidate for decoding the slice of the current picture.

In this respect, even when the delta POC LSBs are unique for a given subset of the pictures stored to decoded picture buffer 160, entropy decoding module 150 may determine most significant bits of the picture order count value that identifies the long-term reference picture. The most significant bits in combination with the determined least significant bits is potentially sufficient to distinguish the picture order count value that identifies the long-term reference picture from any other picture order count value that identifies any other picture in decoded picture buffer 160. Entropy decoding module 150 may pass the least significant bits and most significant bits to motion compensation module 162. Motion compensation module 162 may then retrieve the long-term reference picture from decoded picture buffer 160 based on the determined least significant bits of the picture order count value and the determined most significant bits of the picture order count value. Motion compensation module 162 (in conjunction with one or more of modules 154, 156 and 158) may then use the long-term reference picture identified by the determined picture order count value to decode the portion of the current picture in a manner similar to that described above.

FIG. 4 is a flowchart illustrating exemplary operation of a video encoder in performing the first aspect of the techniques described in this disclosure. As one example, video encoder 20 shown in the example of FIG. 2 may encode video data in accordance with the first aspects of the techniques of this disclosure. To encode video data in accordance with the first aspect of the techniques, motion estimation module 122 of video encoder 20 may determine, for a current picture of the video data, a long term reference picture to be used when performing inter-prediction for a current picture of the video data in the manner described above (170). In some instances, this long-term reference picture is a long-term reference picture that is present in decoded picture buffer 114 but that is not specified as one or more long-term reference pictures in a sequence parameter set associated with the current picture.

Motion estimation module 122 may identify this selected long-term reference picture by the above described picture order count value. Motion estimation module 122 may access a sequence parameter set to determine whether the picture order count value that identifies the selected long-term reference picture is present in the sequence parameter set, which as noted above may be denoted as "SPS" (172). In other words, motion estimation module 122 may determine whether this SPS is already signaling this long-term reference picture by determining whether the SPS includes, as one example, the picture order count value that identifies this selected long-term reference picture. When the SPS includes the picture order count value ("YES" 172), motion estimation module 122 determines an index of this long-term reference picture identified by the picture order count value in, as one example, a list of picture order count values that are signaled in the SPS for use in coding the current picture (and possibly other pictures) (174). Motion estimation module 122 may then pass this index to entropy encoding module 116. Entropy encoding module 116 may then specify this index of the long-term reference picture in a bitstream representative of an encoded version of the video data (176).

However, if the picture order count value that identifies the selected long-term reference picture is not specified in the SPS ("NO" 172), motion estimation module 122 may then determine a number of bits to be used to represent the one or more LSBs of a POC value that identifies the long-term reference picture, as described above (178). Motion estimation module 122 may then pass these one or more LSBs of the POC value to entropy encoding module 116. Entropy encoding module 116 may specify the one or more LSBs of the POC value that identifies the LTRP in the bitstream using the determined number of bits used to represent the one or more least significant bits of the picture order count value that identifies the long-term reference picture (180).

Video encoder 20 may then use the long-term reference picture identified by the picture order count value to encode the portion of the current picture. In other words, motion compensation module 124 may also be configured to determine a predicted block by performing inter-prediction using the long-term reference picture in the manner described above (182). Motion compensation module 124 then determines a residual video block based on the predicted block (184). That is, motion compensation module 124 then determines a residual video block by subtracting pixel values of the predicted block from the pixel values of the current video block being coded, forming the residual data as pixel difference values. Summer 50 represents the component or components that perform this subtraction operation.

Transform module 104 then transforms the residual block to determine transform coefficients using a transform, such as a discrete cosine transform (DCT) or a conceptually similar transform (186). Transform module 104 may convert the residual video data from a pixel (spatial) domain to a transform domain, such as a frequency domain. Transform module 104 may send the resulting transform coefficients to quantization unit 54. Quantization module 106 quantizes the transform coefficients to further reduce bit rate (188). The quantization process may reduce the bit depth associated with some or all of the coefficients. Following quantization, entropy encoding module 116 entropy encodes the quantized transform coefficients (190), inserting the entropy quantized transform coefficients into the bitstream, associated with the index and/or least significant bits of the picture order count value (which are commonly specified in a slice header associated with the encoded block of video data).

Figure 5:
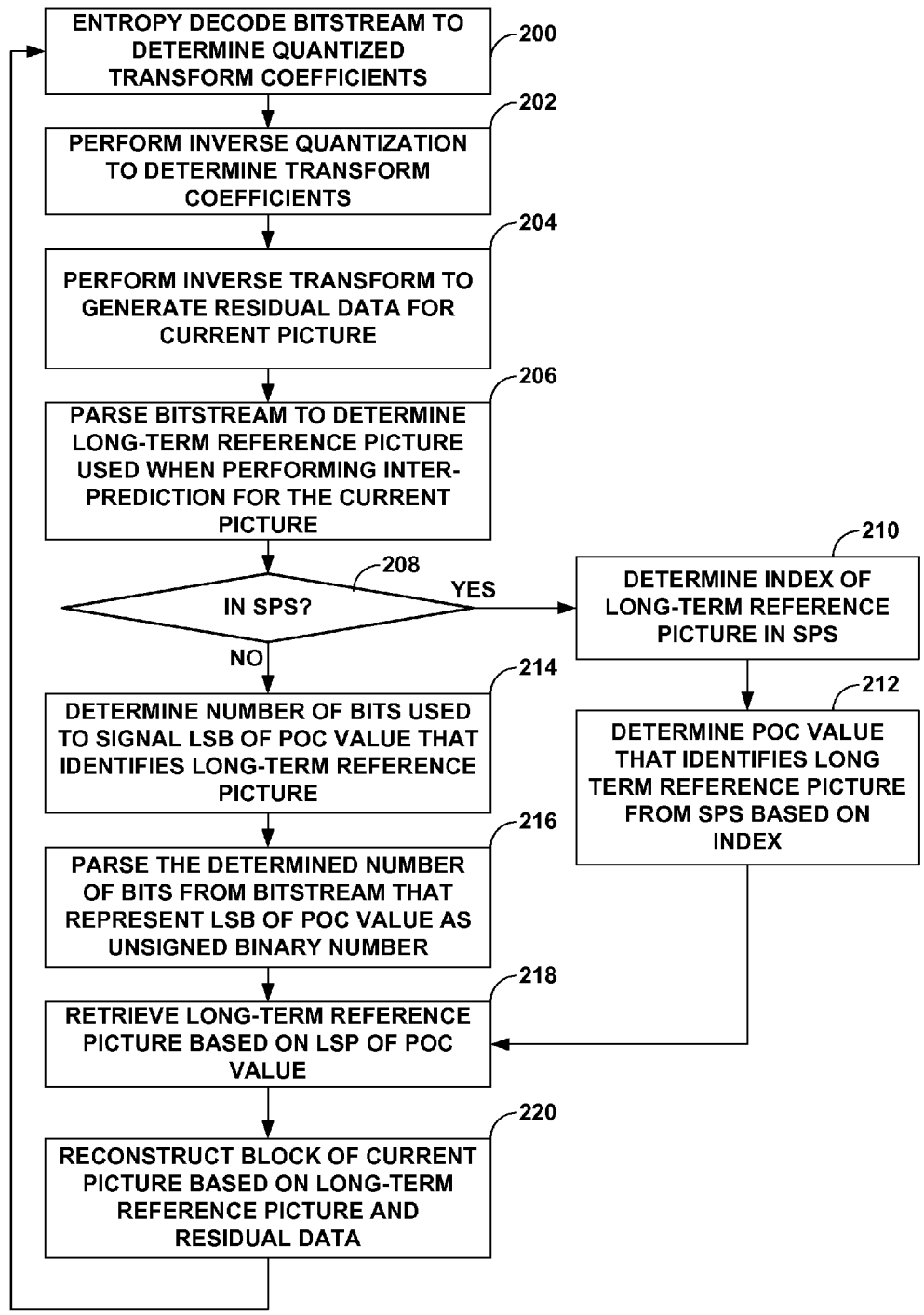
FIG. 5 is a flowchart illustrating exemplary operation of a video decoder in performing the first aspect of the techniques described in this disclosure.

FIG. 5 is a flowchart illustrating exemplary operation of a video decoder in performing the first aspect of the techniques described in this disclosure. As one example, video decoder 30 implements or is configured to perform the first aspect of the techniques described above. Entropy decoding module 150 may entropy decode a bitstream representative of encoded video data to determine quantized transform coefficients corresponding to a block (which may represent a portion) of the encoded video data (200). Entropy decoding module 150 may then pass these quantized transform coefficient to inverse quantization module 154. Inverse quantization module 154 may perform inverse quantization with respect to the quantized transform coefficients to determine transform coefficients (202). Inverse transform module 156 may then perform an inverse transform with respect to the transform coefficients to generate residual data for the current picture (204).

Entropy decoding module 150 may also parse the bitstream to determine, for the block of the current picture, a long-term reference picture used when performing inter-prediction for the block of the current picture (206). Entropy decoding module 150 may determine whether the long-term reference picture has already been signaled in the SPS associated with the current picture (208). If this long-term reference picture has already been signaled in the SPS ("YES" 208), entropy decoding module 150 may determine an index of this long-term reference picture as specified in a list of long-term reference pictures in the SPS (210). Entropy decoding module 150 may then determine the picture order count (POC) value that identifies the long term reference picture from the SPS based on the index (212).

However, if the long-term reference picture is not specified in the SPS ("NO" 208), entropy decoding module 150 determines the number of bits used to signal one or more LSBs of the POC value that identifies the long-term reference picture for use in decoding the current picture (214). In some examples, the number of bits may be explicitly signaled in the bitstream as a syntax element, e.g., in the slice header, as described above. In other examples, entropy decoding module 150 may derive the number of bits as a function of other syntax elements specified in any one or more of the SPS, a picture parameter set (PPS) and the slice header.

Entropy decoding module 150 may then parse the determined number of bits from the bitstream, where the parsed determined number of bits represent the one or more LSBs of the POC that identifies the LTRP as an unsigned binary number (216). Often, the picture order count value that identifies the long-term reference picture is a picture order count value that identifies a long-term reference picture that is present in decoded picture buffer 160 but that is not specified as one or more long-term reference pictures in a sequence parameter set associated with the current picture. Again, the determined number of bits may specify what has been referred to as the POC LSBs above. Entropy decoding module 150 may pass the POC value LSBs to motion compensation module 162. Motion compensation module 162 may then retrieve, from decoded picture buffer 160, the LTRP to be used when decoding at least the portion of the current picture based on the POC LSBs in the manner described above (218).

Motion compensation module 162 retrieves the one of the at least one pictures stored to decoded picture buffer 160 for use as the long-term reference picture in decoding the current picture that has the same LSBs for the POC value associated with the one of the at least one pictures stored to decoded picture buffer 160 as the determined least significant bits of the LTRP to be used to decode the current picture. In other words, motion compensation module 162 may match the POC LSBs with the least significant bits of POC values for pictures stored in decoded picture buffer 160 and identify the picture with the matching POC LSBs as the long-term reference picture that is present in decoded picture buffer 160 but not specified in the SPS associated with the current picture.

Motion compensation module 162 may then use the long-term reference picture identified by the derived picture order count value to decode the portion of the current picture. In other words, one or more motion vectors specified for a coding unit of the current slice of the current picture may reference the LTRP identified by the POC LSBs. Motion compensation module 162 may retrieve various blocks of the LTRP identified by these motion vectors, using these various blocks as reference blocks when performing motion compensation. Video decoder 30 may add residual data coded for blocks of the current slice of the current picture to these reference blocks to generate decoded blocks of video data and thereby reconstruct the original video data, as described above. In this sense, video decoder 30 may reconstruct the block of the current picture based on the long-term reference picture and the residual data (220). Video decoder 30 may store the decoded blocks of video data to decoded picture buffer 160 for later use in decoding subsequent pictures. The video decoder may then decode other slices, if any, of the current picture, similarly as described above.

Figure 6:
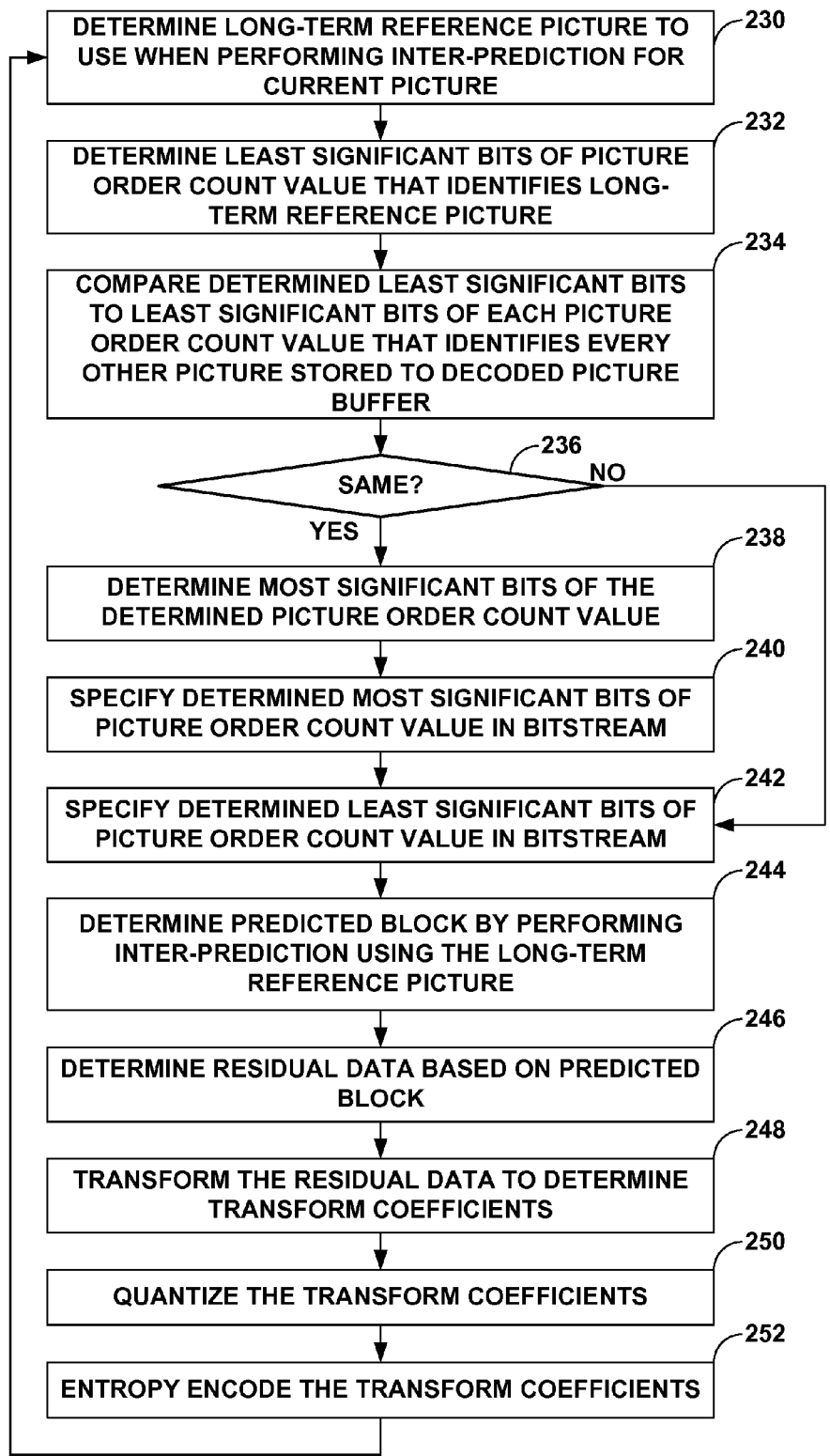
FIG. 6 is a flowchart illustrating exemplary operation of a video encoder in performing the second aspect of the techniques described in this disclosure.

FIG. 6 is a flowchart illustrating exemplary operation of a video encoder in performing the second aspect of the techniques described in this disclosure. As one example, video encoder 20 is configured to implement the second aspects of the techniques described in this disclosure potentially in conjunction with the first aspect of the techniques. In accordance with the second aspects of the techniques, motion estimation module 122 of video encoder 20 may determine, for the current picture of the video data, a long-term reference picture to use when performing inter-prediction for the current picture (230). Motion estimation module 122 may determine one or more least significant bits of a picture order count value that identifies the long-term reference picture (232). Motion estimation module 122 may then determine whether these least significant bits are sufficient to unambiguously identify the long-term reference picture from any other reference picture stored to decoded picture buffer 114 to which the long-term reference picture is also stored (or will be stored depending on the order in which the long-term reference picture is stored in comparison to when this determination is made) in the manner described above.

Motion estimation module 122 may determine whether these least significant bits are sufficient to unambiguously identify the long-term reference picture from any other reference picture stored to decoded picture buffer 114 by, at least in part, determining the least significant bits for at least one picture order count value that identifies a respective one of the other pictures stored to decoded picture buffer 114. Motion estimation module 122 may then determine whether the least significant bits for this picture order count value is the same as the determined least significant bits of the picture order count value that identifies the long-term reference picture. If these two picture order count value least significant bits are the same, motion estimation module 122 may then determine that the least significant bits of the picture order count value that identifies the long-term reference picture to be used when encoding and decoding at least the portion of the current picture are insufficient to uniquely identify the appropriate long-term reference picture. If, however, these two picture order count value least significant bits are not the same, motion estimation module 122 may continue to determine least significant bits of picture order count values that identify another long-term reference picture stored to decoded picture buffer 114, comparing the two picture order count least significant bits until either a match is found or all picture order count values that identify pictures stored to decoded picture buffer 114 have undergone this comparison.

In other words, motion estimation unit 122 may compare the determined least significant bits to least significant bits of each picture order count values that identify every other picture stored to decoded picture buffer 114 (234). When one or more least significant bits of any other picture order count values that identify any other picture stored to decoded picture buffer 114 to which the long-term reference picture is also stored are the same as the determined one or more least significant bits of the picture order count value that identifies the long-term reference picture ("YES" 236), motion estimation module 122 may determine one or more most significant bits of the determined picture order count value that identifies the long-term reference picture to be used when encoding at least the portion of the current picture in the manner described above (238).

Motion estimation module 122 may then forward these least significant bits and most significant bits to entropy encoding module 116. Entropy encoding module 116 may specify the most significant bits of the picture order count value that identifies the long-term reference picture to be used when encoding at least the portion of the current picture in a bitstream representative of an encoded version of the video data (240). Entropy encoding module 116 may also specify the determined one or more least significant bits of the picture order count value that identifies the long-term reference picture to be used when encoding at least the portion of the current picture in the bitstream (242).

When, however, the one or more least significant bits of any other picture order count values that identify any other picture stored to decoded picture buffer 114 to which the long-term reference picture is also stored are not the same as the determined one or more least significant bits of the picture order count value that identifies the long-term reference picture ("NO" 236), motion estimation unit 122 may forward only the determined least significant bits of the picture order count value that identifies the long-term reference picture without otherwise determining the most significant bits because the least significant bits uniquely identify the long-term reference picture with respect to those pictures stored to decoded picture buffer 114. Entropy encoding module 122 may then specify the determined one or more least significant bits of the picture order count value that identifies the long-term reference picture to be used when encoding at least the portion of the current picture in the bitstream without specifying the most significant bits again because the least significant bits uniquely identify the long-term reference picture with respect to those pictures stored to decoded picture buffer 114 (242).

Video encoder 20 may then use the long-term reference picture identified by the picture order count value to encode the portion of the current picture. In other words, motion compensation module 124 may also be configured to determine a predicted block by performing inter-prediction using the long-term reference picture in the manner described above (244). Motion compensation module 124 then determines a residual video block based on the predicted block (246). That is, motion compensation module 124 then determines a residual video block by subtracting pixel values of the predicted block from the pixel values of the current video block being coded, forming the residual data as pixel difference values. Summer 50 represents the component or components that perform this subtraction operation.

Transform module 104 then transforms the residual block to determine transform coefficients using a transform, such as a discrete cosine transform (DCT) or a conceptually similar transform (248). Transform module 104 may convert the residual video data from a pixel (spatial) domain to a transform domain, such as a frequency domain. Transform module 104 may send the resulting transform coefficients to quantization unit 54. Quantization module 106 quantizes the transform coefficients to further reduce bit rate (250). The quantization process may reduce the bit depth associated with some or all of the coefficients. Following quantization, entropy encoding module 116 entropy encodes the quantized transform coefficients (252), inserting the entropy quantized transform coefficients into the bitstream, associated with the index and/or least significant bits of the picture order count value (which are commonly specified in a slice header associated with the encoded block of video data).

Figure 7:
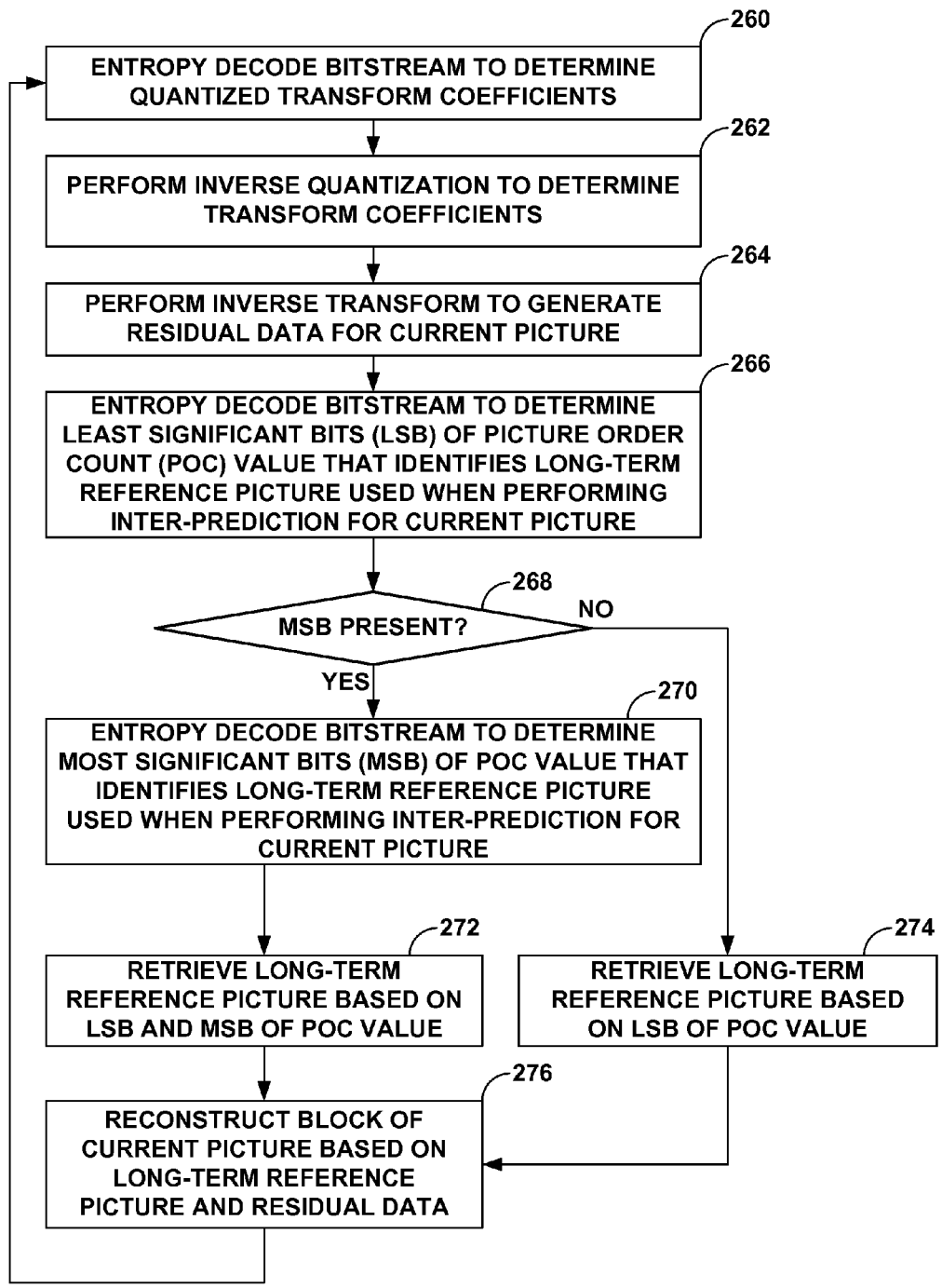
FIG. 7 is a flowchart illustrating exemplary operation of a video decoder in performing the second aspect of the techniques described in this disclosure.

FIG. 7 is a flowchart illustrating exemplary operation of a video decoder in performing the second aspect of the techniques described in this disclosure. As one example, video decoder 30 may implement the second aspects of the techniques described in this disclosure potentially in conjunction with the first aspect of the techniques described in this disclosure. Entropy decoding module 150 may entropy decode a bitstream representative of encoded video data to determine quantized transform coefficients corresponding to a block (which may represent a portion) of the encoded video data (260). Entropy decoding module 150 may then pass these quantized transform coefficient to inverse quantization module 154. Inverse quantization module 154 may perform inverse quantization with respect to the quantized transform coefficients to determine transform coefficients (262). Inverse transform module 156 may then perform inverse transform with respect to the transform coefficients to generate residual data for the current picture (264).

Entropy decoding module 150 may also parse the bitstream to determine, for the block of the current picture, a long-term reference picture used when performing inter-prediction for the block of the current picture. In accordance with the second aspects of the techniques, entropy decoding module 150 may entropy decode the bitstream least significant bits of a picture order count that identifies a long-term reference picture to be used when decoding, i.e., by inter-prediction, at least a portion of a current picture (266). Entropy decoding module 150 may determine whether most significant bits (MSB) for the picture order count value that identifies the long-term reference picture are present in the bitstream (often, by parsing a syntax element in the form of a flag from the bitstream that indicates whether the most significant bits are present) (268).

If these most significant bits are present ("YES" 268), entropy decoding module 150 may entropy decode the bitstream to determine most significant bits of the picture order count value that identifies the long-term reference picture to be used when performing inter-prediction for the current picture (270). Entropy decoding module 150 may pass the least significant bits and most significant bits to motion compensation module 162. Motion compensation module 162 may then retrieve the long-term reference picture from decoded picture buffer 160 based on the determined least significant bits of the picture order count value and the determined most significant bits of the picture order count value (272). If these most significant bits are not present ("NO" 268), entropy decoding module 150 may pass the least significant bits to motion compensation module 162. Motion compensation module 162 may then retrieve the long-term reference picture from decoded picture buffer 160 based on the determined least significant bits of the picture order count value (274)

After retrieving this long-term reference picture, motion compensation module 162 (in conjunction with one or more of modules 154, 156 and 158) may then use the long-term reference picture identified by the determined picture order count value to decode the portion of the current picture in a manner similar to that described above. In other words, one or more motion vectors specified for a coding unit of the current slice of the current picture may reference the LTRP identified by the POC LSBs. Motion compensation module 162 may retrieve various blocks of the LTRP identified by these motion vectors, using these various blocks as reference blocks when performing motion compensation. Video decoder 30 may add residual data coded for blocks of the current slice of the current picture to these reference blocks to generate decoded blocks of video data and thereby reconstruct the original video data, as described above. In this sense, video decoder 30 may reconstruct the block of the current picture based on the long-term reference picture and the residual data (276). Video decoder 30 may store the decoded blocks of video data to decoded picture buffer 160 for later use in decoding subsequent pictures. The video decoder may then decode other slices, if any, of the current picture, similarly as described above.

While described above with respect to full picture order count values, the techniques may also be implemented with respect to delta picture order count values computed as the difference between the picture order count value that identifies the current picture and the picture order count value that identifies the long-term reference picture to be used when coding (which is a term that may be used to refer to both encoding and decoding) the current picture of the video data. In this respect, reference to a picture order count value may refer to both full picture order count values and delta picture order count values. The techniques should therefore not be limited in this respect.

In addition, various other techniques are described which are related to the first and second aspects of the techniques and in some ways described below. As noted above, the latest version of the HEVC WD6 uses a reference picture set (RPS)-based mechanism to manage reference pictures. A RPS refers to a set of reference pictures associated with a picture, consisting of all reference pictures that are prior to the associated picture in decoding order, that may be used for inter prediction of the associated picture or any picture following the associated picture in decoding order. Decoding order may refer to the order in which syntax elements are processed by the decoding process.

In HEVC, an RPS for each coded picture may be directly signaled. Syntax elements for signaling of RPS are included in both a sequence parameter set (SPS) and a slice header associated with each coded picture. For a particular coded picture, the RPS may be one of those alternative sets included in the SPS as indicated by a flag in the slice header, or directly signaled in the slice header.

The RPS for each picture consists of five different lists of reference pictures, which may also be referred to the five RPS subsets. The first RPS subset may refer to RefPicSet- StCurrBefore, which includes all short-term reference pictures (STRPs) that are prior to the current picture in both decoding order and output order and that may be used in inter-prediction of the current picture. The second RPS subset may refer to RefPicSetStCurrAfter, which includes all short-term reference pictures that are prior to the current picture in decoding order, that succeed the current picture in output order, and that may be used in inter-prediction of the current picture. The third RPS subset may refer to RefPicSetStFoll, which includes all short-term reference pictures that may be used in inter-prediction of one or more of the pictures following the current picture in decoding order and that are not used in inter-prediction of the current picture. The fourth RPS subset may refer to RefPicSetLtCurr, which includes all long-term reference pictures (LTRP) that may be used in inter-prediction of the current picture. The fifth RPS subset may refer to RefPicSetLtFoll, which includes all long-term reference pictures that may be used in inter-prediction of one or more of the pictures following the current picture in decoding order and that are not used in inter-prediction of the current picture. Output order may refer to the order in which the decoded pictures are output from the decoded picture buffer (DPB) in case the decoded pictures are to be output from the DPB. The output order of a picture may be specified by the picture order count (POC) value, often regardless of whether the picture is to be output.

In any event, there are a number of potential issues with respect to how HEVC WD6 indicates these RPS subsets may be derived and signaled. The first problem concerns, HEVC WD6 subclause 8.3.2, equation (Eqn.) 8-6, where the derivation of the RPS subsets according to this Eqn. 8-6 may depend on the status of reference pictures in the DPB as a result of the previous picture (due to the wording of "there is a long-term reference picture picX in the DPB" or similar). However, this wording in subclause 8.3.2 may be counter to a fundamental principle of RPS that the status of reference pictures in the DPB be "intra-coded," which may mean it is not to depend on earlier status. In other words, determining a current RPS for a current picture may depend on previous storage of a LTRP ("picX") in the DPB despite that a fundamental principle of RPS is that the reference picture status in the DPB is intra-coded and not inter-coded and therefore should be used for temporal inter-coding decision making The second problem relates to the derivation of LTRPs in the RPS. From Eqn. 8-6 in subclause 8.3.2 of HEVC WD6, the LTRP is identified by its POC least significant bit (LSB) (which is denoted as "pic_order_cnt_lsb"), if the delta_poc_msb_present_flag[i] is equal to 0, or its full POC value (denoted by "PicOrderCntVal") otherwise. However, in the latter case, the part in Eqn. 8-5 of HEVC WD6 for derivation of an LTRP's full POC value, "((PicOrderCntVal−DeltaPocLt[i]+MaxPicOrderCntLsb) % MaxPicOrderCntLsb)−(DeltaPocMSBCycleLt[i])*MaxPicOrderCntLsb", may be incorrect.

For example, if MaxPicOrderCntLsb=256, and the current picture has full POC value equal to 256*10+100 (LSB equal to 100), pictures with full POC values 256*8+100 and 256*6+100 results in two LTRPs with the same POC LSB value of 100. Given the above, DeltaPocMSBCycleLt[i] for the two LRTPs would be equal to 2 and 4, respectively. According to Eqn. 8-5, the full POC values of the two LTRPs would be −256*2 and −256*4, respectively, which is incorrect.

A third problem associated with the RPS derivation in HEVC WD6 may be that once a picture is signalled as a LTRP, it can never be signalled as a short term reference picture (STRP).

A fourth problem associated with the RPS derivation in HEVC WD6 may be that the POC LSB of a LTRP to be included in the RPS of a picture is signalled in the slice header as a delta of the LSB of the delta POC values, coded using ue(v). This may be inefficient, as the delta of the LSB of the delta POC values are typically big for LTRPs thus requiring many bits to represent. This is also not straightforward for encoders to figure out what value to signal in the slice header.

A fifth problem associated with the RPS derivation in HEVC WD6 may be that, when there are two or more LTRPs having the same value of POC LSB, the full POC values of all these LTRPs must be signalled, wherein the POC MSB values are signalled as a delta of two continuous LTRPs having the same POC LSBs, using ue(v). For the first one of a set of continuously signalled LTRPs having the same POC LSBs, the POC MSB is directly signalled, using ue(v). There may be two inefficiency aspects here. The first is that the delta of POC MSB values and the directly signalled POC MSB value for the first LTRP in a set can be big and, therefore, may require many bits to represent the values. The second is that, in most cases, adding a few more LSB (or equivalently, making the length of the MSB a bit longer) may enable unique identification of all the LTRPs. Accordingly, it may not be necessary to signal all the MSB values for LTRPs having the same LSB values.

To potentially solve the above identified problems, various techniques are described below for derivation of reference picture set (RPS) and signaling of long-term reference pictures (LTRPs) to be included in the RPS of a coded picture, including the above noted first and second aspects of the techniques described above with respect to FIGS. 1-7. Again, while described below with respect to HEVC WD6, the techniques may be implemented with respect to any video coding standard or other coding techniques involving inter-prediction with respect to reference data. Moreover, gray highlighting is used below to denote changes to HEVC WD6.

In one aspect, slice header syntax and semantics as specified HEVC WD6 may be modified, where the slice header syntax is changed as follows: syntax elements poc_lsb_len_delta[i] and poc_lsb_lt[i] are added, and syntax elements delta_poc_lsb_lt[i], delta_poc_msb_present_flag[i] and delta_poc_msb_cycle_lt_minus1[i] are removed, with the other syntax elements left unchanged. The slice header syntax may therefore resemble that shown below in Table 1, where the bolded and italicized portions shown below reflect additions or changes to HEVC in support of one or more aspects of the techniques described in this disclosure.

TABLE 1

| slice_header( ) { | Descriptor |
|---|---|
| ... | |
|   if( long_term_ref_pics_present_flag ) { | |
|     num_long_term_pics | ue(v) |
|     for( i = 0; i < num_long_term_pics; i++ ) { | |
|       *poc_lsb_len_delta[i]* | *ue(v)* |
|       *poc_lsb_lt[i]* | *u(v)* |
|       used_by_curr_pic_lt_flag[ i ] | u(1) |
|     } | |
|   } | |
| ... | |
| } | |

The slice header semantics may also be changed as follows: semantics of syntax elements poc_lsb_len_delta[i] and poc_lsb_lt[i] are added, and semantics of syntax elements delta_poc_lsb_lt[i], delta_poc_msb_present_flag[i] and delta_poc_msb_cycle_lt_minus1[i] are removed, with the semantics for other syntax elements left unchanged.

The syntax element poc_lsb_len_delta[i] may specify the number of bits to represent poc_lsb_lt[i].

The variable PocLsbLtLen[i] maybe derived as follows:
if(i==0)
  PocLsbLtLen[i]=
log 2_max_pic_order_cnt_lsb_minus4+4+poc_lsb_len_delta[i]
else
  PocLsbLtLen[i]=PocLsbLtLen[i−1]+poc_lsb_len_delta[i]

The syntax element poc_lsb_[i] may specify the least significant bits of the picture order count value of the i-th long-term reference picture that is included in the long-term reference picture set of the current picture. This syntax element poc_lsb_lt[i] may be in the range of 0 to (1<<PocLsbLtLen[i])−1, inclusive. The length of poc_lsb_lt[i] may be PocLsbLtLen[i]. Alternatively, the variable PocLsbLtLen[i] may be derived as follows:

PocLsbLtLen[i]=
log 2_max_pic_order_cnt_lsb_minus4+4+poc_lsb_len_delta[i]

The decoding process for reference picture sets specified in section 8.3.3 of HEVC WD6 may be changed as follows, where gray highlighting or shading indicates additions and/ or changes to section 8.3.2 of HEVC WD6 as currently specified. The following reproduces much of section 8.3.2 of HEVC WD6.

This process is invoked once per picture, after decoding of a slice header but prior to the decoding of any coding unit and prior to the decoding process for reference picture list construction of the slice as specified in subclause 8.3.3 of HEVC WD6. The process may result in marking one or more reference pictures as "unused for reference".

NOTE 1—The reference picture set is an absolute description of the reference pictures used in the decoding process of the current and future coded pictures.

The reference picture set signalling is explicit in the sense that all reference pictures included in the reference picture set are listed explicitly and there is no default reference picture set construction process in the decoder that depends on the status of the decoded picture buffer.

Short-term reference pictures are identified by their PicOrderCntVal values. Long-term reference pictures are identified by the least significant bits of their PicOrderCntVal values.

Five lists of picture order count values or least significant bits of picture order count are constructed to derive the reference picture set; PocStCurrBefore, PocStCurrAfter, PocStFoll, PocLtCurr, and PocLtFoll with NumPocStCurrBefore, NumPocStCurrAfter, NumPocStFoll, NumPocLtCurr, and NumPocLtFoll number of elements, respectively.

If the current picture is an IDR picture, PocStCurrBefore, PocStCurrAfter, PocStFoll, PocLtCurr, and PocLtFoll are all set to empty, and NumPocStCurrBefore, NumPocStCurrAfter, NumPocStFoll, NumPocLtCurr, and NumPocLtFoll are all set to 0.

Otherwise, the following applies for derivation of the five lists of picture order count values and the numbers of entries.

```
for( i = 0, j = 0, k = 0; i < NumNegativePics[ StRpsIdx ] ; i++ )
    if( UsedByCurrPicS0[ StRpsIdx ][ i ] )
        PocStCurrBefore[ j++ ] = PicOrderCntVal + DeltaPocS0[ StRpsIdx ][ i ]
    else
        PocStFoll[ k++ ] = PicOrderCntVal + DeltaPocS0[ StRpsIdx ][ i ]
NumPocStCurrBefore = j
for( i = 0, j = 0; i < NumPositivePics[ StRpsIdx ]; i++ )
    if( UsedByCurrPicS1[ StRpsIdx ][ i ] )
        PocStCurrAfter[ j++ ] = PicOrderCntVal + DeltaPocS1[ StRpsIdx ][ i ]
    else
        PocStFoll[ k++ ] = PicOrderCntVal + DeltaPocS1[ StRpsIdx ][ i ]
NumPocStCurrAfter = j
NumPocStFoll = k                                                           (8-5)
for( i = 0, j = 0, k = 0; i < num_long_term_pics; i++ )
    if( used_by_curr_pic_lt_flag[ i ] ) {
        PocLtCurr[ j ] = poc_lsb_lt[ i ]
        PocLsbLenCurr[ j ] = PocLsbLtLen[ i ]
        j++
    }
    else {
        PocLtFoll[ k ] = poc_lsb_lt[ i ]
        ExtPocLsbLenFoll[ k ] = PocLsbLtLen[ i ]
        k++
    }
NumPocLtCurr = j
NumPocLtFoll = k
``` where PicOrderCntVal is the picture order count of the current picture as specified in subclause 8.2.1 of HEVC WD6.

NOTE 2—A value of StRpsIdx in the range from 0 to num_short_term_ref_pic_sets−1, inclusive, indicates that a short-term reference picture set from the active sequence parameter set is being used, where StRpsIdx is the index of the short-term reference picture set to the list of short-term reference picture sets in the order in which they are signalled in the sequence parameter set. StRpsIdx equal to num_short_term_ref_pic_sets indicates that a short-term reference picture set explicitly signalled in the slice header is being used.

The reference picture set consists of five lists of reference pictures; RefPicSetStCurrBefore, RefPicSetStCurrAfter, RefPicSetStFoll, RefPicSetLtCurr and RefPicSetLtFoll. The variable NumPocTotalCurr is set equal to NumPocStCurrBefore+NumPocStCurrAfter+NumPocLtCurr. When decoding a P or B slice, it is a requirement of bitstream conformance that the value of NumPocTotalCurr shall not be equal to 0.

NOTE 3—RefPicSetStCurrBefore, RefPicSetStCurrAfter and RefPicSetLtCurr contains all reference pictures that may be used in inter prediction of the current picture and that may be used in inter prediction of one or more of the pictures following the current picture in decoding order. RefPicSetStFoll and RefPicSetLtFoll consists of all reference pictures that are not used in inter prediction of the current picture but may be used in inter prediction of one or more of the pictures following the current picture in decoding order.

The marking of a reference picture can be "unused for reference," "used for short-term reference," or "used for long-term reference," but only one among these three. When a reference picture is referred to as being marked as "used for reference," this collectively refers to the picture being marked as "used for short-term reference" or "used for long-term reference" (but not both). A reference picture that is marked as "used for short-term reference" is referred to as a short-term reference picture. A reference picture that is marked as "used for long-term reference" is referred to as a long-term reference picture.

The derivation process for the reference picture set and picture marking are performed according to the following ordered steps, where DPB refers to the decoded picture buffer as described in Annex C of HEVC WD6:

1. The following applies:
   ```
   for( i = 0; i < NumPocStCurrBefore; i++ )
       if( there is a reference picture picX in the DPB with PicOrderCntVal equal
   to PocStCurrBefore[ i ] )
           RefPicSetStCurrBefore[ i ] = picX
       else
           RefPicSetStCurrBefore[ i ] = "no reference picture"
   for( i = 0; i < NumPocStCurrAfter; i++ )
       if( there is a reference picture picX in the DPB with PicOrderCntVal equal
   to PocStCurrAfter[ i ] )
           RefPicSetStCurrAfter[ i ] = picX
       else
           RefPicSetStCurrAfter[ i ] = "no reference picture"                 (8-6)
   for( i = 0; i < NumPocStFoll; i++ )
       if( there is a reference picture picX in the DPB with PicOrderCntVal equal
   to PocStFoll[ i ] )
           RefPicSetStFoll[ i ] = picX
       else
           RefPicSetStFoll[ i ] = "no reference picture"
   ```
2. All reference pictures included in RefPicSetStCurrBefore, RefPicSetStCurrAfter and RefPicSetStFoll are marked as "used for short-term reference".
3. The following applies:
   ```
   for( i = 0; i < NumPocLtCurr; i++ ) {
       if( there is a reference picture picX in the DPB, not included in
   RefPicSetStCurrBefore,
                   RePicSetStCurrAfter or RefPicSetStFoll, with PicOrderCntVal for
   which
               Abs( PicOrderCntVal) % ( 2^{PocLsbLenCurr[ i ]} ) is equal to
   PocLtCurr[ i ] )
           RefPicSetLtCurr[ i ] = picX
       else
           RefPicSetLtCurr[ i ] = "no reference picture"
   }
   for( i = 0; i < NumPocLtFoll; i++ ) {
       if( there is a reference picture picX in the DPB, not included in
   RefPicSetStCurrBefore,
                   RefPicSetStCurrAfter or RefPicSetStFoll, with PicOrderCntVal
   for which
                   Abs( PicOrderCntVal) % ( 2^{PocLsbLenFoll[ i ]} ) is equal to
   PocLtFoll[ i ] )
           RefPicSetLtFoll[ i ] = picX
       else
           RefPicSetLtFoll[ i ] = "no reference picture"
   }
   ```
4. All reference pictures included in RefPicSetLtCurr and RefPicSetLtFoll are marked as "used for long-term reference"
5. All reference pictures in the decoded picture buffer that are not included in RefPicSetLtCurr, RefPicSetLtFoll, RefPicSetStCurrBefore, RefPicSetStCurrAfter or RefPicSetStFoll are marked as "unused for reference".

NOTE 4 -
There may be one or more reference pictures that are included in the reference picture set but that are not present in the decoded picture buffer. When the first coded picture in the bitstream is an IDR picture or the current coded picture is not a leading picture of the first coded picture in the bitstream, entries in RefPicSetStFoll or RefPicSetLtFoll that are equal to "no reference picture" should be ignored. When the first coded picture in the bitstream is not a CRA picture or the current coded picture is not a leading picture of the first coded picture in the bitstream, an unintentional picture loss should be inferred for each entry in RefPicSetStCurrBefore, RefPicSetStCurrAfter and RefPicSetLtCurr that is equal to "no reference picture".

Alternatively, in the above steps, the words "there is a reference picture picX" is changed to "there is a picture picX".

It is a requirement of bitstream conformance that the reference picture set is restricted as follows:

There shall be no reference picture with temporal_id greater than that of the current picture included in RefPicSetStCurrBefore, RefPicSetStCurrAfter or RefPicSetLtCurr.

For each value of i in the range of 0 to NumPocLtCurr−1, inclusive, there shall be no more than one reference picture in the DPB that is not included in RefPicSetStCurrBefore, RefPicSetStCurrAfter or RefPicSetStFoll, and that has PicOrderCntVal for which Abs(PicOrderCntVal) % ($2^{PocLsbLenCurr[i]}$) is equal to PocLtCurr[i]. For each value of i in the range of 0 to NumPocLtFoll−1, inclusive, there shall not be more than one reference picture in the DPB that is not included in RefPicSetStCurrBefore, RefPicSetStCurrAfter or RefPicSetStFoll, and that has PicOrderCntVal for which Abs(PicOrderCntVal) % ($2^{PocLsbLenFoll[i]}$) is equal to PocLtFoll[i].

There shall be no reference picture included in the reference picture set that precedes, in output order, any CRA picture that precedes the current picture both in decoding order and output order.

When the first coded picture in the bitstream is an IDR picture or the current coded picture is not a leading picture of the first coded picture in the bitstream, there shall be no entry in RefPicSetStCurrBefore, RefPicSetStCurrAfter or RefPicSetLtCurr that is equal to "no reference picture".

NOTE 5—A reference picture cannot be included in more than one of the five reference picture set lists.

In another aspect, the techniques may modify slice header syntax and semantics to add syntax elements poc_lsb_lt[i], add_poc_lsb_len[i] and add_poc_lsb[i], and remove syntax elements delta_poc_lsb_lt[i], delta_poc_msb_present_flag[i] and delta_poc_msb_cycle_lt_minus1[i], leaving the other syntax elements unchanged. The following Table 2 illustrates these changes, where additions and/or changes are denoted using gray highlighting or shading:

TABLE 2

| slice_header( ) { | Descriptor |
|---|---|
| ... | |
|     if( long_term_ref_pics_present_flag ) { | |
|         num_long_term_pics | ue(v) |
|         for( i = 0; i < num_long_term_pics; i++ ) { | |
|             poc_lsb_lt[ i ] | u(v) |
|             add_poc_lsb_len[ i ] | ue(v) |
|             if(add_poc_lsb_len[ i ] != 0 ) | |
|                 add_poc_lsb[ i ] | u(v) |
|             used_by_curr_pic_lt_flag[ i ] | u(1) |
|         } | |
|     } | |
| ... | |
| } | |

The slice header semantics may be changed to add semantics of syntax elements poc_lsb_lt[i], add_poc_lsb_len[i] and add_poc_lsb[i], and remove semantics of syntax elements delta_poc_lsb_lt[i], delta_poc_msb_present_flag[i] and delta_poc_msb_cycle_lt_minus1[i], leaving unchanged semantics for other syntax elements.

The syntax element poc_lsb_lt[i] may specify the least significant bits of the picture order count value of the i-th long-term reference picture that is included in the long-term reference picture set of the current picture. The length of poc_lsb_lt[i] may be log 2_max_pic_order_cnt_lsb_minus4+4 bits.

The syntax element add_poc_lsb_len[i] may specify the number of additional least significant bits of the picture order count value of the i-th long-term reference picture that is included in the long-term reference picture set of the current picture. add_poc_lsb_len[i] shall be in the range of 0 to 32−log 2_max_pic_order_cnt_lsb_minus4−4, inclusive.

The syntax element add_poc_lsb[i] may specify the value of the additional least significant bits of the picture order count value of the i-th long-term reference picture that is included in the long-term reference picture set of the current picture. poc_lsb_lt[i] shall be in the range of 1 to (1<<add_poc_lsb_len[i])−1, inclusive. The length of add_poc_lsb[i] is add_poc_lsb_len[i] bits.

The decoding process for reference picture set specified in section 8.3.3 of HEVC WD6 may be changed as follows, where again the gray highlighting or shading indicates additions and/or changes to section 8.3.2 of HEVC WD6 as currently specified. The following reproduces much of section 8.3.2 of HEVC WD6.

This process is invoked once per picture, after decoding of a slice header but prior to the decoding of any coding unit and prior to the decoding process for reference picture list construction of the slice as specified in subclause 8.3.3. The process may result in marking one or more reference pictures as "unused for reference".

NOTE 1—The reference picture set is an absolute description of the reference pictures used in the decoding process of the current and future coded pictures. The reference picture set signalling is explicit in the sense that all reference pictures included in the reference picture set are listed explicitly and there is no default reference picture set construction process in the decoder that depends on the status of the decoded picture buffer.

Short-term reference pictures are identified by their PicOrderCntVal values. Long-term reference pictures are identified by the least significant bits of their PicOrderCntVal values.

Five lists of picture order count values or least significant bits of picture order count are constructed to derive the reference picture set; PocStCurrBefore, PocStCurrAfter, PocStFoll, PocLtCurr, and PocLtFoll with NumPocStCurrBefore, NumPocStCurrAfter, NumPocStFoll, NumPocLtCurr, and NumPocLtFoll number of elements, respectively.

If the current picture is an IDR picture, PocStCurrBefore, PocStCurrAfter, PocStFoll, PocLtCurr, and PocLtFoll are all set to empty, and NumPocStCurrBefore, NumPocStCurrAfter, NumPocStFoll, NumPocLtCurr, and NumPocLtFoll are all set to 0.

Otherwise, the following applies for derivation of the five lists of picture order count values and the numbers of entries.

```
for( i = 0, j = 0, k = 0; i < NumNegativePics[ StRpsIdx ] ; i++ )
    if( UsedByCurrPicS0[ StRpsIdx ][ i ] )
        PocStCurrBefore[ j++ ] = PicOrderCntVal + DeltaPocS0[ StRpsIdx ][ i ]
    else
        PocStFoll[ k++ ] = PicOrderCntVal + DeltaPocS0[ StRpsIdx ][ i ]
NumPocStCurrBefore = j
for( i = 0, j = 0; i < NumPositivePics[ StRpsIdx ]; i++ )
    if( UsedByCurrPicS1[ StRpsIdx ][ i ] )
        PocStCurrAfter[ j++ ] = PicOrderCntVal + DeltaPocS1[ StRpsIdx ][ i ]
    else
        PocStFoll[ k++ ] = PicOrderCntVal + DeltaPocS1[ StRpsIdx ][ i ]
NumPocStCurrAfter = j
NumPocStFoll = k                                                              (8-5)
for( i = 0, j = 0, k = 0; i < num_long_term_pics; i++ )
    if( used_by_curr_pic_lt_flag[ i ] ) {
        PocLtCurr[ j ] = add_poc_lsb[ i ] *MaxPicOrderCntLsb + poc_lsb_lt[ i ]
        ExtPocLsbLenCurr[ j ] =
log2_max_pic_order_cnt_lsb_minus4 + 4 + add_poc_lsb_len[ i ]
        j++
    }
    else {
        PocLtFoll[ k ] = add_poc_lsb[ i ] *MaxPicOrderCntLsb + poc_lsb_lt[ i ]
        ExtPocLsbLenFoll[ k ] =
log2_max_pic_order_cnt_lsb_minus4 + 4 + add_poc_lsb_len[ i ]
        k++
    }
NumPocLtCurr = j
NumPocLtFoll = k
``` where PicOrderCntVal is the picture order count of the current picture as specified in subclause 8.2.1.

NOTE 2—A value of StRpsIdx in the range from 0 to num_short_term_ref_pic_sets−1, inclusive, indicates that a short-term reference picture set from the active sequence parameter set is being used, where StRpsIdx is the index of the short-term reference picture set to the list of short-term reference picture sets in the order in which they are signalled in the sequence parameter set. StRpsIdx equal to num_short_term_ref_pic_sets indicates that a short-term reference picture set explicitly signalled in the slice header is being used.

The reference picture set consists of five lists of reference pictures; RefPicSetStCurrBefore, RefPicSetStCurrAfter, RefPicSetStFoll, RefPicSetLtCurr and RefPicSetLtFoll. The variable NumPocTotalCurr is set equal to NumPocStCurrBefore+NumPocStCurrAfter+NumPocLtCurr. When decoding a P or B slice, it is a requirement of bitstream conformance that the value of NumPocTotalCurr shall not be equal to 0.

NOTE 3—RefPicSetStCurrBefore, RefPicSetStCurrAfter and RefPicSetLtCurr contains all reference pictures that may be used in inter prediction of the current picture and that may be used in inter prediction of one or more of the pictures following the current picture in decoding order. RefPicSetStFoll and RefPicSetLtFoll consists of all reference pictures that are not used in inter prediction of the current picture but may be used in inter prediction of one or more of the pictures following the current picture in decoding order.

The marking of a reference picture can be "unused for reference," "used for short-term reference," or "used for long-term reference," but only one among these three. When a reference picture is referred to as being marked as "used for reference", this collectively refers to the picture being marked as "used for short-term reference" or "used for long-term reference" (but not both). A reference picture that is marked as "used for short-term reference" is referred to as a short-term reference picture. A reference picture that is marked as "used for long-term reference" is referred to as a long-term reference picture.

The derivation process for the reference picture set and picture marking are performed according to the following ordered steps, where DPB refers to the decoded picture buffer as described in Annex C of HEVC WD6:

```
1. The following applies:
      for( i = 0; i < NumPocStCurrBefore; i++)
          if( there is a reference picture picX in the DPB with PicOrderCntVal equal
      to PocStCurrBefore[ i ] )
              RefPicSetStCurrBefore[ i ] = picX
          else
              RefPicSetStCurrBefore[ i ] = "no reference picture"
      for( i = 0; i < NumPocStCurrAfter; i++)
          if( there is a reference picture picX in the DPB with PicOrderCntVal equal
      to PocStCurr After[ i ] )
              RefPicSetStCurrAfter[ i ] = picX
          else
              RefPicSetStCurrAfter[ i ] = "no reference picture"              (8-67)
      for( i = 0; i < NumPocStFoll; i++ )
          if( there is a reference picture picX in the DPB with PicOrderCntVal equal
      to PocStFoll[ i ] )
              RefPicSetStFoll[ i ] = picX
          else
              RefPicSetStFoll[ i ] = "no reference picture"
```

-continued

2. All reference pictures included in RefPicSetStCurrBefore, RefPicSetStCurrAfter and RefPicSetStFoll are marked as "used for short-term reference".
3. The following applies:
   for( i = 0; i < NumPocLtCurr; i++ ) {
       if( there is a reference picture picX in the DPB, not included in RefPicSetStCurrBefore,
              RefPicSetStCurrAfter or RefPicSetStFoll, with PicOrderCntVal for
   which
              Abs( PicOrderCntVal) % ( $2^{ExtPocLsbLenCurr[\,i\,]}$ ) is    equal to PocLtCurr[ i ] )
              RefPicSetLtCurr[ i ] = picX
       else
              RefPicSetLtCurr[ i ] = "no reference picture"
   }
   for( i = 0; i < NumPocLtFoll; i++ ) {
       if( there is a reference picture picX in the DPB, not included in RefPicSetStCurrBefore,
              RefPicSetStCurrAfter or RefPicSetStFoll, with PicOrderCntVal
   for which
              Abs( PicOrderCntVal) % ( $2^{ExtPocLsbLenFoll[\,i\,]}$ ) is equal to
   PocLtFoll[ i ] )
              RefPicSetLtFoll[ i ] = picX
       else
              RefPicSetLtFoll[ i ] = "no reference picture"
   }
4. All reference pictures included in RefPicSetLtCurr and RefPicSetLtFoll are marked as "used for long-term reference"
5. All reference pictures in the decoded picture buffer that are not included in RefPicSetLtCurr, RefPicSetLtFoll, RefPicSetStCurrBefore, RefPicSetStCurrAfter or RefPicSetStFoll are marked as "unused for reference".

NOTE 4—There may be one or more reference pictures that are included in the reference picture set but that are not present in the decoded picture buffer. When the first coded picture in the bitstream is an IDR picture or the current coded picture is not a leading picture of the first coded picture in the bitstream, entries in RefPicSetStFoll or RefPicSetLtFoll that are equal to "no reference picture" should be ignored. When the first coded picture in the bitstream is not a CRA picture or the current coded picture is not a leading picture of the first coded picture in the bitstream, an unintentional picture loss should be inferred for each entry in RefPicSetSt-CurrBefore, RefPicSetStCurrAfter and RefPicSetLt-Curr that is equal to "no reference picture".

Alternatively, in the above steps, the words "there is a reference picture picX" is changed to "there is a picture picX".

It is a requirement of bitstream conformance that the reference picture set is restricted as follows:
   There shall be no reference picture with temporal_id greater than that of the current picture included in RefPicSetStCurrBefore, RefPicSetStCurrAfter or Ref-PicSetLtCurr.
   For each value of i in the range of 0 to NumPocLtCurr−1, inclusive, there shall be no more than one reference picture in the DPB that is not included in RefPicSet-StCurrBefore, RefPicSetStCurrAfter or RefPicSetSt-Foll, and that has PicOrderCntVal for which Abs(Pi-cOrderCntVal) % ($2^{ExtPocLsbLenCurr[i]}$) is equal to PocLtCurr[i]. For each value of i in the range of 0 to NumPocLtFoll−1, inclusive, there shall not be more than one reference picture in the DPB that is not included in RefPicSetStCurrBefore, RefPicSetStCur-rAfter or RefPicSetStFoll, and that has PicOrderCntVal for which Abs(PicOrderCntVal) % ($2^{ExtPocLsbLenFoll[i]}$) is equal to PocLtFoll[i].
   There shall be no reference picture included in the reference picture set that precedes, in output order, any CRA picture that precedes the current picture both in decoding order and output order.
   When the first coded picture in the bitstream is an IDR picture or the current coded picture is not a leading picture of the first coded picture in the bitstream, there shall be no entry in RefPicSetStCurrBefore, RefPicSet-StCurrAfter or RefPicSetLtCurr that is equal to "no reference picture".

NOTE 5—A reference picture cannot be included in more than one of the five reference picture set lists.

A third aspect of the techniques may be based on the first aspect of the techniques described above. In this third aspect, in the slice header syntax, one more syntax element may be added for each LTRP to be included in the RPS to signal the start bit of the POC of the LTRP, with value 0 indicating, as one example, starting from the least significant bit (bit 0), value 1 indicating starting from second least significant bit (bit 1), and so on. PocLsbLtLen[i] may then be derived the same way as in the first aspect of the techniques described above where PocLsBLtLen[i] is derived based on poc_lsb_len_delta[i]. However, in this third aspect of the techniques, PocLsbLtLen[i] may represent the number of bits of the POC of the LTRP starting from start bit as identified above by the additional syntax element, where poc_lsb_lt[i] specifies the value of the PocLsbLtLen [i] bits of the POC of the LRTP starting from start bit as identified above by the additional syntax element.

It may then be required that in the DPB there is only one reference picture (or, alternatively, only one picture) that has the same set of bits of the POC value equal to that indicated for the LTRP, excluding those included in RefPicSetSt-CurrBefore, RefPicSetStCurrAfter or RefPicSetStFoll. Thus, the LTRP may then be uniquely identified by the set of bits, and in Eqn. 8-7 of HEVC WD6, this condition (instead of the condition that the set of least significant bits of the POC value equal to that indicated for the LTRP) may be used to identify a reference picture (or, alternatively, a picture) to be included into RefPicSetLtCurr[i] or RefPic- SetLtFoll[i]. The other portions of the third aspect of the techniques may be similar to those described above with respect to the first aspect of the techniques.

A fourth aspect of the techniques described in this disclosure may represent a variation of the second aspects of the techniques described above. In this fourth aspect, the slice header syntax may include add_poc_lsb_len[i], which represents a delta of the length of the additional LSB signalled by add_poc_lsb[i]. If i is equal to 0, add_poc_lsb_len[i] may specify the length of the additional LSB signalled by add_poc_lsb[i]; otherwise, add_poc_lsb_len[i] may specify the difference between the length add_poc_lsb[i] and the length of add_poc_lsb[i−1]. The other portions of the fourth aspect of the techniques may be similar to those described above with respect to the second aspect of the techniques.

A fifth aspect of the techniques may be based on the first aspect of the techniques described above. In this fifth aspect, to signal a LTRP, instead of signaling the POC LSB starting from the very least significant bit, a truncated POC LSB may be signaled.

The slice header syntax may be changed to add syntax elements poc_lsb_len_delta[i] and poc_lsb_lt[i] and remove syntax elements delta_poc_lsb_lt[i], delta_poc_msb_present_flag[i] and delta_poc_msb_cycle_lt_minus1[i] removed, leaving the other syntax elements unchanged. The following Table 3 illustrates how these changes may affect the slice header, with gray highlighting or shading denoting changes and/or additions.

TABLE 3

| slice_header( ) { | Descriptor |
|---|---|
| ... | |
| if( long_term_ref_pics_present_flag ) { | |
| num_long_term_pics | ue(v) |
| for( i = 0; i < num_long_term_pics; i++ ) { | |
| poc_lsb_len_truncated_delta[ i ] | ue(v) |
| poc_lsb_lt_truncated[ i ] | u(v) |
| used_by_curr_pic_lt_flag[ i ] | u(1) |
| } | |
| } | |
| ... | |
| } | | poc_lsb_len_truncated_delta[i] may be used to specify the number of bits to represent poc_lsb_truncated_lt[i]. The variable PocLsbLtTrunLen[i] may be derived as follows:
if(i==0)
　PocLsbLtTrunLen[i]=
　　log 2_max_pic_order_cnt_lsb_minus4+4+poc_lsb_len_truncated_delta[i]−NumTruncatedBits
else
　PocLsbLtTrunLen[i]=
　PocLsbLtTrunLen[i−1]+poc_lsb_len_truncated_delta[i]
NumTruncatedBits may be set equal to
　log 2_max_pic_order_cnt_lsb_minus4+4, and in this PocLsbLtTrunLen[0] is equal to poc_lsb_len_truncated_delta[0]. This value can also be signalled in PPS or SPS.

poc_lsb_truncated_lt[i] may specify the least significant bits, after truncating NumTruncatedBits bits, of the picture order count value of the i-th long-term reference picture that is included in the long-term reference picture set of the current picture, in other words, bit NumTruncatedBits to bit NumTruncatedBits+PocLsbLtTrunLen[i]−1, inclusive, of the picture order count value of the i-th long-term reference picture that is included in the long-term reference picture set of the current picture. These bits are referred as the truncated bit set for the i-th LTRP that is included in the long-term reference picture set of the current picture. Syntax element poc_lsb_trunctated_lt[i] may be in the range of 0 to (1<<PocLsbLtTrunLen[i])−1, inclusive. The length of poc_lsb_lt[i] may, as one example, be PocLsbLtTrunLen[i].

Long-term reference pictures are typically identified by the truncated bit set of their PicOrderCntVal values. No two reference pictures (or, alternatively, no two pictures) in the DPB (excluding those included in RefPicSetStCurrBefore, RefPicSetStCurrAfter or RefPicSetStFoll) may have the same value for the same set of bits for their PicOrderCntVal values. Thus, the LTRP may be uniquely identified by the truncated bit set, and in Eqn. 8-7 of HEVC WD6, this condition (instead of the condition that the set of least significant bits of the POC value equal to that indicated for the LTRP) is used to identify a reference picture (or, alternatively, a picture) to be included into RefPicSetLtCurr[i] or RefPicSetLtFoll[i].

As an alternative, the NumTruncatedBits may be signaled in each slice, when LTRP pictures are signaled. Table 4 illustrates this alternative, with gray highlighting or shading denoting changes and/or additions:

TABLE 4

| slice_header( ) { | Descriptor |
|---|---|
| ... | |
| if( long_term_ref_pics_present_flag ) { | |
| num_long_term_pics | ue(v) |
| num_truncated_bits | u(v) |
| for( i = 0; i < num_long_term_pics; i++ ) { | |
| poc_lsb_len_truncated_delta[ i ] | ue(v) |
| poc_lsb_lt_truncated[ i ] | u(v) |
| used_by_curr_pic_lt_flag[ i ] | u(1) |
| } | |
| } | |
| ... | |
| } | |

In Table 4, num_truncated_bits may specify the least significant bits of a POC value to be truncated when identifying a LTRP from the POC LSB. This syntax element may be in the range of 0 to log 2_max_pic_order_cnt_lsb_minus4+4, inclusive, and the length may be ceil(log 2(log 2_max_pic_order_cnt_lsb_minus4+4+1)). As yet another alternative, num_truncated_bits may be signaled in ue(v) and can be larger than log 2_max_pic_order_cnt_lsb_minus4+4.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
    determining, for a current picture of the video data, one or more least significant bits of a picture order count value that directly identifies a long-term reference picture to be used when encoding at least a portion of the current picture;
    when one or more least significant bits of any other picture order count values that identify any other picture stored to a decoded picture buffer to which the long-term reference picture is also stored are the same as the determined one or more least significant bits of the picture order count value, determining one or more most significant bits of a delta of the picture order count value directly identifying the long-term reference picture and a picture order count value directly identifying the current picture;
    specifying both the determined one or more least significant bits and the determined one or more most significant bits in a bitstream representative of an encoded version of the video data; and
    encoding at least the portion of the current picture using the long-term reference picture.

2. The method of claim 1, wherein the determined one or more least significant bits of the picture order count that directly identifies the long-term reference picture to be used when decoding at least the portion of the current picture uniquely identify the picture order count value from any other picture order count value specified in one or more of a slice header associated with at least a portion of the current picture, a picture parameter set associated with the current picture and a sequence parameter set associated with the picture.

3. The method of claim 1, further comprising:
    determining the one or more least significant bits for at least one picture order count value that directly identifies a respective one of the other pictures stored to the decoded picture buffer; and
    determining whether the one or more least significant bits for the at least one picture order count value that directly identifies the respective one of the other pictures stored to the decoded picture buffer is the same as the determined one or more least significant bits of the picture order count value that directly identifies the long-term reference picture.

4. The method of claim 1, wherein determining the one or more most significant bits of the picture order count value comprises determining the one or more most significant bits of the delta of the picture order count value such that the one or more most significant bits in combination with the determined one or more least significant bits is sufficient to uniquely identify the picture order count value that identifies the long-term reference picture from any other picture order count value that identifies any other picture in the decoded picture buffer.

5. The method of claim 1, further comprising:
    determining a number of bits to be used to represent the one or more least significant bits of the picture order count value that directly identifies the long-term reference picture in a bitstream representative of an encoded version of the video data; and
    specifying the one or more least significant bits of the picture order count value that directly identifies the long-term reference picture in the bitstream using the determined number of bits used to represent one or more least significant bits of the picture order count value that directly identifies the long-term reference picture.

6. The method of claim 5, wherein the picture order count value that identifies the long-term reference picture comprises a picture order count value that identifies a long-term reference picture that is present in a decoded picture buffer but that is not specified as one or more long-term reference pictures in a sequence parameter set associated with the current picture.

7. The method of claim 5, wherein specifying both the determined one or more least significant bits and the determined one or more most significant bits comprises specifying an unsigned binary number having a number of bits equal to the determined number of bits used to represent the one or more least significant bits of the picture order count value that directly identifies the long-term reference picture.

8. The method of claim 5, further comprising specifying the determined number of bits used to represent the one or more least significant bits of the picture order count value that directly identifies the long-term reference picture in the bitstream.

9. The method of claim 5, wherein determining the number of bits comprises determining the number of bits to be used to represent the one or more least significant bits of the picture order count value that directly identifies the long-term reference picture in the bitstream based on syntax elements previously determined for one or more of the current picture and previously encoded pictures of the video data so as to avoid specifying in the bitstream the determined number of bits to be used to represent the one or more least significant bits of the picture order count value that directly identifies the long-term reference picture.

10. The method of claim 5, wherein specifying the determined one or more least significant bits and the determined one or more most significant bits of the picture order count value comprises specifying the one or more least significant bits of the picture order count value that directly identifies the long-term reference picture in a slice header associated with at least the portion of the current picture.

11. A video encoding device for encoding video data, the video encoding device comprising:
a memory configured to store a current picture of the video data; and
one or more processors configured to determine, for the current picture of the video data, one or more least significant bits of a picture order count value that directly identifies a long-term reference picture to be used when encoding at least a portion of the current picture, when one or more least significant bits of any other picture order count values that identify any other picture stored to a decoded picture buffer to which the long-term reference picture is also stored are the same as the determined one or more most significant bits of the picture order count value, determine one or more most significant bits of a delta of the picture order count value directly identifying the long-term reference picture and a picture order count value directly identifying the current picture, specify both the determined one or more least significant bits and the determined one or more most significant bits in a bitstream representative of an encoded version of the video data, and encode at least the portion of the current picture using the long-term reference picture.

12. The video encoding device of claim 11, wherein the determined one or more least significant bits of the picture order count that directly identifies the long-term reference picture to be used when decoding at least the portion of the current picture uniquely identify the picture order count value from any other picture order count value specified in one or more of a slice header associated with at least a portion of the current picture, a picture parameter set associated with the current picture and a sequence parameter set associated with the picture.

13. The video encoding device of claim 11, wherein the one or more processors are further configured to determine the one or more least significant bits for at least one picture order count value that directly identifies a respective one of the other pictures stored to the decoded picture buffer, and determine whether the one or more least significant bits for the at least one picture order count value that directly identifies the respective one of the other pictures stored to the decoded picture buffer is the same as the determined one or more least significant bits of the picture order count value that directly identifies the long-term reference picture.

14. The video encoding device of claim 11, wherein the one or more processors are further configured to, when determining the one or more most significant bits of the delta of the picture order count value, determine the one or more most significant bits of the delta of the picture order count value such that the one or more most significant bits in combination with the determined one or more least significant bits is sufficient to uniquely identify the picture order count value that identifies the long-term reference picture from any other picture order count value that identifies any other picture in the decoded picture buffer.

15. The video encoding device of claim 11, wherein the one or more processors are further configured to determining a number of bits to be used to represent the one or more least significant bits of the picture order count value that directly identifies the long-term reference picture in a bitstream representative of an encoded version of the video data, and specify the one or more least significant bits of the picture order count value that directly identifies the long-term reference picture in the bitstream using the determined number of bits used to represent one or more least significant bits of the picture order count value that directly identifies the long-term reference picture.

16. The video encoding device of claim 15, wherein the picture order count value that identifies the long-term reference picture comprises a picture order count value that identifies a long-term reference picture that is present in a decoded picture buffer but that is not specified as one or more long-term reference pictures in a sequence parameter set associated with the current picture.

17. The video encoding device of claim 15, wherein the one or more processors are further configured to, when specifying both the determined one or more least significant bits and the determined one or more most significant bits, specify an unsigned binary number having a number of bits equal to the determined number of bits used to represent the one or more least significant bits of the picture order count value that directly identifies the long-term reference picture.

18. The video encoding device of claim 15, wherein the one or more processors are further configured to specify the determined number of bits used to represent the one or more least significant bits of the picture order count value that directly identifies the long-term reference picture in the bitstream.

19. The video encoding device of claim 15, wherein the one or more processors are further configured to, when determining the number of bits, determine the number of bits to be used to represent the one or more least significant bits of the picture order count value that directly identifies the long-term reference picture in the bitstream based on syntax elements previously determined for one or more of the current picture and previously encoded pictures of the video data so as to avoid specifying in the bitstream the determined number of bits to be used to represent the one or more least significant bits of the picture order count value that directly identifies the long-term reference picture.

20. The video encoding device of claim 15, wherein the one or more processors are further configured to, when specifying the determined one or more least significant bits and the determined one or more most significant bits, specify the one or more least significant bits of the picture order count value that directly identifies the long-term reference picture in a slice header associated with at least the portion of the current picture.

21. A video encoding device for encoding video data, the video encoding device comprising:
   means for determining, for a current picture of the video data, one or more least significant bits of a picture order count value that directly identifies a long-term reference picture to be used when encoding at least a portion of the current picture, and when one or more least significant bits of any other picture order count values that identify any other picture stored to a decoded picture buffer to which the long-term reference picture is also stored are the same as the determined one or more least significant bits of the picture order count value,
   means for determining one or more most significant bits of a delta of the picture order count value directly identifying the long-term reference picture and a picture order count value directly identifying the current picture;
   means for specifying both the determined one or more least significant bits and the determined one or more most significant bits in a bitstream representative of an encoded version of the video data, and
   means for encoding at least the portion of the current picture using the long-term reference picture.

22. The video encoding device of claim 21, wherein the determined one or more least significant bits of the picture order count that directly identifies the long-term reference picture to be used when decoding at least the portion of the current picture uniquely identify the picture order count value from any other picture order count value specified in one or more of a slice header associated with at least a portion of the current picture, a picture parameter set associated with the current picture and a sequence parameter set associated with the picture.

23. The video encoding device of claim 21, further comprising:
   means for determining the one or more least significant bits for at least one picture order count value that directly identifies a respective one of the other pictures stored to the decoded picture buffer; and
   means for determining whether the one or more least significant bits for the at least one picture order count value that directly identifies the respective one of the other pictures stored to the decoded picture buffer is the same as the determined one or more least significant bits of the picture order count value directly that identifies the long-term reference picture.

24. The video encoding device of claim 21, wherein the means for determining the one or more most significant bits of the picture order count value comprises means for determining the one or more most significant bits of the delta of the picture order count value such that the one or more most significant bits in combination with the determined one or more least significant bits is sufficient to uniquely identify the picture order count value that identifies the long-term reference picture from any other picture order count value that identifies any other picture in the decoded picture buffer.

25. A non-transitory computer-readable storage medium having stored thereon instructions that, when executed, cause one or more processors of a video encoding device to:
   determine, for a current picture of video data, one or more least significant bits of a picture order count value that directly identifies a long-term reference picture to be used when encoding at least a portion of the current picture;
   when one or more least significant bits of any other picture order count values that identify any other picture stored to a decoded picture buffer to which the long-term reference picture is also stored are the same as the determined one or more least significant bits of the picture order count value, determine one or more most significant bits a delta of the picture order count value directly identifying the long-term reference picture and a picture order count value directly identifying the current picture;
   specify both the determined one or more least significant bits and the determined one or more most significant bits in a bitstream representative of an encoded version of the video data; and
   encode at least the portion of the current picture using the long-term reference picture.

26. The non-transitory computer-readable storage medium of claim 25, wherein the determined one or more least significant bits of the picture order count that directly identifies the long-term reference picture to be used when decoding at least the portion of the current picture uniquely identify the picture order count value from any other picture order count value specified in one or more of a slice header associated with at least a portion of the current picture, a picture parameter set associated with the current picture and a sequence parameter set associated with the picture.

27. The non-transitory computer-readable storage medium of claim 25, having further stored thereon instructions that, when executed, cause the one or more processors to:
   determine the one or more least significant bits for at least one picture order count value that directly identifies a respective one of the other pictures stored to the decoded picture buffer; and
   determine whether the one or more least significant bits for the at least one picture order count value that directly identifies the respective one of the other pictures stored to the decoded picture buffer is the same as the determined one or more least significant bits of the picture order count value that directly identifies the long-term reference picture.

28. The non-transitory computer-readable storage medium of claim 25, wherein the instructions that, when executed, cause the one or more processor to determine the one or more most significant bits of the delta of the picture order count value comprises determining the one or more most significant bits of the delta of the picture order count value such that the one or more most significant bits in combination with the determined one or more least significant bits is sufficient to uniquely identify the picture order count value that identifies the long-term reference picture from any other picture order count value that identifies any other picture in the decoded picture buffer.

29. The non-transitory computer-readable storage medium of claim 25, having further stored thereon instructions that, when executed, cause the one or more processors to:

determine a number of bits to be used to represent the one or more least significant bits of a picture order count value that directly identifies the long-term reference picture in a bitstream representative of an encoded version of the video data; and specify the one or more least significant bits of the picture order count value that directly identifies the long-term reference picture in the bitstream using the determined number of bits used to represent one or more least significant bits of the picture order count value that directly identifies the long-term reference picture.

30. The non-transitory computer-readable storage medium of claim 29, wherein the picture order count value that identifies the long-term reference picture comprises a picture order count value that identifies a long-term reference picture that is present in a decoded picture buffer but that is not specified as one or more long-term reference pictures in a sequence parameter set associated with the current picture.

31. A method of decoding encoded video data, the method comprising:

determining, for a current picture of the encoded video data, one or more least significant bits of a picture order count value that directly identify a long-term reference picture to be used when decoding at least a portion of the current picture, and wherein the one or more least significant bits do not uniquely identify the picture order count value of the long-term reference picture with respect to the one or more least significant bits of any other picture order count value that identifies any other picture present in a decoded picture buffer to which the long-term reference picture is also stored;

determining one or more most significant bits of a delta of the picture order count value directly identifying the long-term reference picture and a picture order count value directly identifying the current picture, wherein the one or more most significant bits in combination with the determined one or more least significant bits is sufficient to distinguish the picture order count value of the long-term reference picture from any other picture order count value that identifies any other picture in the decoded picture buffer;

retrieving the long-term reference picture from the decoded picture buffer based on the determined one or more least significant bits and the determined one or more most significant bits; and decoding at least the portion of the current picture using the retrieved long-term reference picture.

32. The method of claim 31, wherein the determined one or more least significant bits of the picture order count that directly identifies the long-term reference picture to be used when decoding at least the portion of the current picture uniquely identify the picture order count value from any other picture order count value specified in one or more of a slice header associated with at least a portion of the current picture, a picture parameter set associated with the current picture and a sequence parameter set associated with the picture.

33. The method of claim 31, wherein determining the one or more least significant bits of the picture order count value that directly identifies the long-term reference picture to be used when decoding at least the portion of the current picture comprises parsing, from a bitstream representative of the encoded video data, the one or more least significant bits of the picture order count value that directly identifies the long-term reference picture to be used when decoding at least the portion of the current picture; and wherein determining the one or more most significant bits comprises parsing, from the bitstream, the one or more most significant bits.

34. The method of claim 31, wherein determining the one or more least significant bits of the picture order count value that directly identifies the long-term reference picture to be used when decoding at least the portion of the current picture comprises parsing, from one or more of a slice header, a picture parameter set and a sequence parameter set associated with at least the portion of the current picture, the one or more least significant bits of the picture order count value that directly identifies the long-term reference picture to be used when decoding at least the portion of the current picture.

35. The method of claim 31, wherein determining the one or more most significant bits comprises parsing, from one or more of a slice header, a picture parameter set and a sequence parameter set associated with at least the portion of the current picture, the one or more most significant bits.

36. The method of claim 31, further comprising:

determining a number of bits used to represent the one or more least significant bits of the picture order count value that directly identifies the long-term reference picture to be used when decoding at least the portion of the current picture; and parsing the determined number of bits from a bitstream representative of the encoded video data, wherein the parsed determined number of bits represents the one or more least significant bits of the picture order count value that directly identifies the long-term reference picture.

37. The method of claim 36, wherein the picture order count value that identifies the long-term reference picture comprises a picture order count value that identifies a long-term reference picture that is present in the decoded picture buffer but that is not specified as one or more long-term reference pictures in a sequence parameter set associated with the current picture.

38. The method of claim 36, wherein the parsed determined number of bits represent the least significant bits of the picture order count value that directly identifies the long-term reference picture as an unsigned binary number.

39. The method of claim 36, wherein determining the number of bits used to represent the one or more least significant bits of the picture order count value that directly identifies the long-term reference picture to be used when decoding at least a portion of the current pictures comprises parsing the number of bits used to represent the one or more least significant bits of the picture order count value that directly identifies the long-term reference picture to be used when decoding at least a portion of the current pictures from the bitstream.

40. The method of claim 36, wherein determining the number of bits comprises determining the number of bits to be used to represent the one or more least significant bits of the picture order count value that directly identifies the long-term reference picture based on syntax elements previously determined for one or more of the current picture and previously encoded pictures of the video data without having to parse from the bitstream the determined number of bits used to represent the one or more least significant bits of the picture order count value that directly identifies the long-term reference picture.

41. A video decoding device for decoding encoded video data, the video decoding device comprising:

a memory configured to store a current picture of the encoded video data; and one or more processors configured to determine, for the current picture of the encoded video data, one or more least significant bits of a picture order count value that directly identify a long-term reference picture to be used when decoding at least a portion of the current picture, and wherein the one or more least significant bits do not uniquely identify the picture order count value of the long-term reference picture with respect to the one or more least significant bits of any other picture order count value that identifies any other picture present in a decoded picture buffer to which the long-term reference picture is also stored, determine one or more most significant bits of a delta of the picture order count value directly identifying the long-term reference picture and a picture order count value directly identifying the current picture, wherein the one or more most significant bits in combination with the determined one or more least significant bits is sufficient to distinguish the picture order count value of the long-term reference picture from any other picture order count value that identifies any other picture in the decoded picture buffer, retrieve the long-term reference picture from the decoded picture buffer based on the determined one or more least significant bits and the determined one or more most significant bits, and decode at least the portion of the current picture using the retrieved long-term reference picture.

42. The video decoding device of claim 41, wherein the determined one or more least significant bits of the picture order count that directly identifies the long-term reference picture to be used when decoding at least the portion of the current picture uniquely identify the picture order count value from any other picture order count value specified in one or more of a slice header associated with at least a portion of the current picture, a picture parameter set associated with the current picture and a sequence parameter set associated with the picture.

43. The video decoding device of claim 41,
wherein the one or more processors are further configured to, when determining the one or more least significant bits of the picture order count value that directly identifies the long-term reference picture to be used when decoding at least the portion of the current picture, parse, from a bitstream representative of the encoded video data, the one or more least significant bits of the picture order count value that directly identifies the long-term reference picture to be used when decoding at least the portion of the current picture; and
wherein the one or more processors are further configured to, when determining the one or more most significant bits, parse, from the bitstream, the one or more most significant bits.

44. The video decoding device of claim 41, wherein the one or more processors are further configured to, when determining the one or more least significant bits of the picture order count value that directly identifies the long-term reference picture to be used when decoding at least the portion of the current picture, parse, from one or more of a slice header, a picture parameter set and a sequence parameter set associated with at least the portion of the current picture, the one or more least significant bits of the picture order count value that directly identifies the long-term reference picture to be used when decoding at least the portion of the current picture.

45. The video decoding device of claim 41, wherein the one or more processors are further configured to, when determining the one or more most significant bits, parse, from one or more of a slice header, a picture parameter set and a sequence parameter set associated with at least the portion of the current picture, the one or more most significant bits.

46. The video decoding device of claim 41, wherein the one or more processors are further configured to determine a number of bits used to represent the one or more least significant bits of the picture order count value that directly identifies the long-term reference picture to be used when decoding at least the portion of the current picture, and parse the determined number of bits from a bitstream representative of the encoded video data, wherein the parsed determined number of bits represents the one or more least significant bits of the picture order count value that directly identifies the long-term reference picture.

47. The video decoding device of claim 46, wherein the picture order count value that identifies the long-term reference picture comprises a picture order count value that identifies a long-term reference picture that is present in the decoded picture buffer but that is not specified as one or more long-term reference pictures in a sequence parameter set associated with the current picture.

48. The video decoding device of claim 46, wherein the parsed determined number of bits represent the least significant bits of the picture order count value that directly identifies the long-term reference picture as an unsigned binary number.

49. The video decoding device of claim 46, wherein the one or more processors are further configured to, when determining the number of bits used to represent the one or more least significant bits of the picture order count value that directly identifies the long-term reference picture to be used when decoding at least a portion of the current pictures, parse the number of bits used to represent the one or more least significant bits of the picture order count value that directly identifies the long-term reference picture to be used when decoding at least a portion of the current pictures from the bitstream.

50. The video decoding device of claim 46, wherein the one or more processors are further configured to, when determining the number of bits, determine the number of bits to be used to represent the one or more least significant bits of the picture order count value that directly identifies the long-term reference picture based on syntax elements previously determined for one or more of the current picture and previously encoded pictures of the video data without having to parse from the bitstream the determined number of bits used to represent the one or more least significant bits of the picture order count value that directly identifies the long-term reference picture.

51. A video decoding device for decoding encoded video data, the video decoding device comprising:
means for determining, for a current picture of the encoded video data, one or more least significant bits of a picture order count value that directly identify a long-term reference picture to be used when decoding at least a portion of the current picture, and wherein the one or more least significant bits do not uniquely identify the picture order count value of the long-term reference picture with respect to the one or more least significant bits of any other picture order count value that identifies any other picture present in a decoded picture buffer to which the long-term reference picture is also stored;

means for determining one or more most significant bits of a delta of the picture order count value directly identifying the long-term reference picture and a picture order count value directly identifying the current picture, wherein the one or more most significant bits in combination with the determined one or more least significant bits is sufficient to distinguish the picture order count value from any other picture order count value that identifies any other picture in the decoded picture buffer;

means for retrieving the long-term reference picture from the decoded picture buffer based on the determined one or more least significant bits and the determined one or more most significant bits; and means for decoding at least the portion of the current picture using the retrieved long-term reference picture.

52. The video decoding device of claim 51, wherein the determined one or more least significant bits of the picture order count that directly identifies the long-term reference picture to be used when decoding at least the portion of the current picture uniquely identify the picture order count value from any other picture order count value specified in one or more of a slice header associated with at least a portion of the current picture, a picture parameter set associated with the current picture and a sequence parameter set associated with the picture.

53. The video decoding device of claim 51,
wherein the means for determining the one or more least significant bits of the picture order count value that directly identifies the long-term reference picture to be used when decoding at least the portion of the current picture comprises means for parsing, from a bitstream representative of the encoded video data, the one or more least significant bits of the picture order count value that directly identifies the long-term reference picture to be used when decoding at least the portion of the current picture; and wherein the means for determining the one or more most significant bits comprises means for parsing, from the bitstream, the one or more most significant bits.

54. The video decoding device of claim 51, wherein the means for determining the one or more least significant bits of the picture order count value that directly identifies the long-term reference picture to be used when decoding at least the portion of the current picture comprises means for parsing, from one or more of a slice header, a picture parameter set and a sequence parameter set associated with at least the portion of the current picture, the one or more least significant bits of the picture order count value that directly identifies the long-term reference picture to be used when decoding at least the portion of the current picture.

55. The video decoding device of claim 51, wherein the means for determining the one or more most significant bits comprises means for parsing, from one or more of a slice header, a picture parameter set and a sequence parameter set associated with at least the portion of the current picture, the one or more most significant bits.

56. A non-transitory computer-readable storage medium having stored thereon instructions that, when executed, cause one or more processors of video decoding device to:
determine, for a current picture of encoded video data, one or more least significant bits of a picture order count value that directly identify a long-term reference picture to be used when decoding at least a portion of the current picture, and wherein the one or more least significant bits do not uniquely identify the picture order count value of the long-term reference picture with respect to the one or more least significant bits of any other picture order count value that identifies any other picture present in a decoded picture buffer to which the long-term reference picture is also stored;

determine one or more most significant bits of a delta of the picture order count value directly identifying the long-term reference picture and a picture order count value directly identifying the current picture, wherein the one or more most significant bits in combination with the determined one or more least significant bits is sufficient to distinguish the picture order count value from any other picture order count value that identifies any other picture in the decoded picture buffer;

retrieve the long-term reference picture from the decoded picture buffer based on the determined one or more least significant bits and the determined one or more most significant bits; and decode at least the portion of the current picture using the retrieved long-term reference picture.

57. The non-transitory computer-readable storage medium of claim 56, wherein the determined one or more least significant bits of the picture order count that directly identifies the long-term reference picture to be used when decoding at least the portion of the current picture uniquely identify the picture order count value from any other picture order count value specified in one or more of a slice header associated with at least a portion of the current picture, a picture parameter set associated with the current picture and a sequence parameter set associated with the picture.

58. The non-transitory computer-readable storage medium of claim 56,
wherein the instructions that, when executed, cause the one or more processor to determine the one or more least significant bits of the picture order count value that directly identifies the long-term reference picture to be used when decoding at least the portion of the current picture comprise instructions that, when executed, cause the one or more processors to parse, from a bitstream representative of the encoded video data, the one or more least significant bits of the picture order count value that directly identifies the long-term reference picture to be used when decoding at least the portion of the current picture; and wherein the instructions that, when executed, cause the one or more processor to determine the one or more most significant bits comprise instructions that, when executed, cause the one or more processors to parse, from the bitstream, the one or more most significant bits.

59. The non-transitory computer-readable storage medium of claim 56, wherein the instructions that, when executed, cause the one or more processor to determine the one or more least significant bits of the picture order count value that directly identifies the long-term reference picture to be used when decoding at least the portion of the current picture comprise instructions that, when executed, cause the one or more processors to parse, from one or more of a slice header, a picture parameter set and a sequence parameter set associated with at least the portion of the current picture, the one or more least significant bits of the picture order count value that directly identifies the long-term reference picture to be used when decoding at least the portion of the current picture.

60. The non-transitory computer-readable storage medium of claim 56, wherein the instructions that, when executed, cause the one or more processor to determine the one or more most significant bits comprise instructions that, when executed, cause the one or more processors to parse, from one or more of a slice header, a picture parameter set and a sequence parameter set associated with at least the portion of the current picture, the one or more most significant bits.

61. The non-transitory computer-readable storage medium of claim 56, having further stored thereon instructions that, when executed, cause the one or more processors to:
determine a number of bits used to represent the one or more least significant bits of the picture order count value that directly identifies the long-term reference picture to be used when decoding at least the portion of the current picture; and
parse the determined number of bits from a bitstream representative of the encoded video data, wherein the parsed determined number of bits represents the one or more least significant bits of the picture order count value that directly identifies the long-term reference picture.

62. The non-transitory computer-readable storage medium of claim 61, wherein the picture order count value that identifies the long-term reference picture comprises a picture order count value that identifies a long-term reference picture that is present in the decoded picture buffer but that is not specified as one or more long-term reference pictures in a sequence parameter set associated with the current picture.

63. The non-transitory computer-readable storage medium of claim 61, wherein the parsed determined number of bits represent the least significant bits of the picture order count value that directly identifies the long-term reference picture as an unsigned binary number.

64. The non-transitory computer-readable storage medium of claim 61, wherein the instructions that, when executed, cause the one or more processor to determine the number of bits used to represent the one or more least significant bits of the picture order count value that directly identifies the long-term reference picture to be used when decoding at least a portion of the current pictures comprise instructions that, when executed, cause the one or more processors to parse the number of bits used to represent the one or more least significant bits of the picture order count value that directly identifies the long-term reference picture to be used when decoding at least a portion of the current pictures from the bitstream.

65. The non-transitory computer-readable storage medium of claim 61, wherein the instructions that, when executed, cause the one or more processor to determine the number of bits comprise instructions that, when executed, cause the one or more processors to determine the number of bits to be used to represent the one or more least significant bits of the picture order count value that directly identifies the long-term reference picture based on syntax elements previously determined for one or more of the current picture and previously encoded pictures of the video data without having to parse from the bitstream the determined number of bits used to represent the one or more least significant bits of the picture order count value that directly identifies the long-term reference picture.

66. The method of claim 1, wherein specifying both the determined one or more least significant bits and the determined one or more most significant bits comprises specifying a poc_lsb_lt syntax element and a delta_poc_msb_cycle_lt syntax element.

67. The video encoding device of claim 11, wherein the one or more processors are configured to specify a poc_lsb_lt syntax element and a delta_poc_msb_cycle_lt syntax element.

68. The video encoding device of claim 21, wherein the means for specifying comprise means for specifying a poc_lsb_lt syntax element and a delta_poc_msb_cycle_lt syntax element.

69. The non-transitory computer-readable storage medium of claim 25, having further stored thereon instructions that, when executed, cause the one or more processors to specify a poc_lsb_lt syntax element and a delta_poc_msb_cycle_lt syntax element.

70. The method of claim 31,
wherein determining the one or more least significant bits comprises determining a poc_lsb_lt syntax element, and
wherein determining the one or more most significant bits comprises determining a delta_poc_msb_cycle_lt syntax element.

71. The video decoding device of claim 41, wherein the one or more processors are configured to determine a poc_lsb_lt syntax element and determine a delta_poc_msb_cycle_lt syntax element.

72. The video decoding device of claim 51,
wherein the means for determining the one or more least significant bits comprises means for determining a poc_lsb_lt syntax element, and
wherein the means for determining the one or more most significant bits comprises means for determining a delta_poc_msb_cycle_lt syntax element.

73. The non-transitory computer-readable storage medium of claim 56, having further stored thereon instructions that, when executed, cause the one or more processors to determine a poc_lsb_lt syntax element and determine a delta_poc_msb_cycle_lt syntax element.

74. The method of claim 31, the method being executable on a wireless communication device, wherein the device comprises:
a memory configured to store the encoded video data;
a processor configured to execute instructions to process the encoded video data stored in said memory; and
a receiver configured to receive the encoded video data.

75. The method of claim 74, wherein the wireless communication device is a cellular telephone and the encoded video data is received by the receiver and modulated according to a cellular communication standard.

76. The device of claim 41, wherein the device is a wireless communication device, further comprising a receiver configured to receive the encoded video data.

77. The device of claim 76, wherein the wireless communication device is a cellular telephone and the encoded video data is received by the receiver and modulated according to a cellular communication standard.

* * * * *